US008297836B2

(12) United States Patent
Kuntz et al.

(10) Patent No.: US 8,297,836 B2
(45) Date of Patent: Oct. 30, 2012

(54) INJECTION MOLDING FLOW CONTROL APPARATUS AND METHOD

(75) Inventors: John Peter Kuntz, Papendrecht (NL); Sebastiaan Hubertus Franciscus Smits, Tilburg (NL); Michael Lewis Vasapoli, Gloucester, MA (US); Christian Götz, Bensheim (DE); Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 233 days.

(21) Appl. No.: 12/614,604

(22) Filed: Nov. 9, 2009

(65) Prior Publication Data
US 2010/0091814 A1 Apr. 15, 2010

Related U.S. Application Data

(63) Continuation of application No. PCT/US2009/050551, filed on Jul. 14, 2009.

(60) Provisional application No. 61/080,410, filed on Jul. 14, 2008.

(51) Int. Cl.
*G01K 1/08* (2006.01)
*G01K 1/14* (2006.01)
*G01K 13/00* (2006.01)

(52) U.S. Cl. ......... 374/147; 374/148; 425/547; 425/549

(58) Field of Classification Search .................. 374/147, 374/E7.01; 236/69
See application file for complete search history.

(56) References Cited

U.S. PATENT DOCUMENTS

| 5,871,786 | A | | 2/1999 | Hume et al. |
| 6,022,210 | A | | 2/2000 | Gunther |
| 6,095,789 | A | * | 8/2000 | Hepler et al. ................. 425/549 |
| 6,158,886 | A | * | 12/2000 | Dutcher et al. ............... 374/179 |
| 2004/0066834 | A1 | | 4/2004 | Ren |
| 2004/0185142 | A1 | * | 9/2004 | Olaru ............................ 425/564 |
| 2004/0258787 | A1 | * | 12/2004 | Olaru et al. .................... 425/143 |
| 2007/0154588 | A1 | * | 7/2007 | Gellert et al. ................. 425/549 |

FOREIGN PATENT DOCUMENTS

| DE | 25 39 785.7 A1 | 3/1977 |
| DE | 94 07 758.4 U1 | 9/1994 |
| DE | 10 2006 041 328 B3 | 1/2008 |
| JP | 60127124 | 7/1985 |

OTHER PUBLICATIONS

Oct. 9, 2009 International Search Report and Written Opinion in related application PCT/US2009/050551.

* cited by examiner

*Primary Examiner* — Lisa Caputo
*Assistant Examiner* — Roger Hernandez-Prewitt
(74) *Attorney, Agent, or Firm* — Rissman Hendricks & Oliverio, LLP

(57) ABSTRACT

Apparatus for measuring the temperature of a nozzle having fluid material injected from an injection molding machine through a flow channel in a heated manifold that is coupled to a nozzle that is coupled to the cavity of a mold, the apparatus comprising:
a heating device comprising a controllably heatable thermally conductive heating element;
the heating element of the heating device being mounted on or around the outer surface of the tube of the nozzle at an end point;
a temperature monitor comprising a temperature sensor mounted on or around the nozzle at a selected position along the axis of the bore of the nozzle; and,
a thermal insulator disposed along the axis of the nozzle separating the end point of the heating element and the temperature sensor.

31 Claims, 18 Drawing Sheets

INJECTION MOLDING FLOW CONTROL APPARATUS AND METHOD

RELATED APPLICATIONS

This application is a continuation of PCT/US2009/050551 filed Jul. 14, 2009 which claims the benefit of priority under 35 USC Section 119 to U.S. provisional patent application Ser. No. 61/080,410 filed Jul. 14, 2008, the disclosure of which is incorporated herein by reference in its entirety as if fully set forth herein.

BACKGROUND OF THE INVENTION

Hotrunners that are typically used in injection molding systems are coupled to a nozzle that is heated. The temperature of the melt material that flows through the body of the nozzle is assumed to be the same as or similar to the temperature of the body of the nozzle itself. The temperature of the body of the nozzle is typically measured using a thermocouple which typically comprises a pair of wires comprised of two different materials that are physically mated with each other at a terminal contact point at which point the mated wires generate an electrical signal that is indicative of the temperature of the surrounding material at that contact point of the two thermocouple wires. In a hotrunner system the terminal contact point of a thermocouple is typically placed in physical engagement or contact with a selected surface of the body of the nozzle or with a sheath or tube or other structure that is in thermally conductive contact with the body of the nozzle in order to attempt to obtain a measurement of the temperature of the melt material that is flowing through the nozzle body at the selected point or position of the nozzle body to be measured.

The accuracy of the temperature reading at the selected point on or along the nozzle body, or on or along the tube or other structure in thermal contact with the nozzle body, is not necessarily reflective of the actual temperature at the particular selected point because the terminal mating point of the thermocouple is in too close physical proximity to the heater device that is used to heat the nozzle (or the tube or other structure with which the nozzle is in contact). Such close proximity of the terminal mating point of the thermocouple with the device that is used to heat the nozzle body causes the thermocouple to read the temperature of the heating device itself or the tube or sheath or other structure that heating device is in thermal contact with, and not necessarily the temperature of the melt material that is flowing through the nozzle at the location at which the terminal mating point of the thermocouple is located. The temperature of the heating device itself, or the structure that the heating device is in contact with, overwhelms the material with which the terminal point of the thermocouple is in contact with and thus the thermocouple is measuring a higher temperature than the actual temperature of the body of the nozzle itself at the precise location of the terminal mating point of the thermocouple resulting in a colder than desired nozzle body temperature (which adversely influences the temperature of the melt flowing through the nozzle body).

SUMMARY OF THE INVENTION

In accordance with the invention there is provided an apparatus for measuring the temperature of a nozzle having fluid material injected from an injection molding machine through a flow channel in a heated manifold that is coupled to a nozzle that is coupled to the cavity of a mold, the apparatus comprising:

a heating device comprising a controllably heatable thermally conductive heating element;

the nozzle comprising a tube of thermally conductive material having an outer surface and an inner surface defining a central flow bore having an axis extending from an upstream end to a downstream end of the flow bore, the flow bore being coupled to the flow channel of the manifold and the cavity of the mold;

the heating element of the heating device being mounted on or around the outer surface of the tube of the nozzle such that heat is transferable between the heating element and the outer surface of the thermally conductive nozzle, the heating element extending along the axis of the flow bore of the nozzle to an end point of the heating element;

a temperature monitor comprising a temperature sensor mounted on or around the nozzle at a selected position along the axis of the bore of the nozzle;

a thermal insulator disposed along the axis of the nozzle separating the end point of the heating element and the temperature sensor.

The temperature sensor is typically mounted on or around the nozzle such that the temperature sensor is spatially separated from the end point of the heating element by at least about 0.125 inches. The temperature sensor is preferably spatially separated from the end point of the heating element by between about 0.125 and about 0.75 inches.

In one embodiment, the temperature monitor comprises a thermocouple comprised of elongated wires having a length that mate with each other at a point along the length of the wires to form the temperature sensor at the point of mating of the wires, the thermocouple being mounted on or around the nozzle such that the temperature sensor is mounted at a position that is thermally isolated from the end point of the heating element.

The thermal insulator is typically disposed between the end point of the heating element and the temperature sensor such that heat transfer between the end point of the heating element and the temperature sensor is substantially reduced. The thermal insulator is preferably comprised of a material having a thermal conductivity of about 10 watts/meter-Kelvin or less. The temperature sensor is preferably separated along the axis from the end point of the heating element by at least about 0.125 inches. Typically, the end point of the heating element and the temperature sensor are both disposed at or near a downstream distal end of the bore of the nozzle.

In a preferred embodiment, the heating element and the temperature sensor are preferably both disposed within an elongated tube comprising a thin-walled sheath, an interior bore and having a length, the thin-walled sheath being comprised of a thermally conductive material, the elongated tube being mounted on or around the nozzle, the heating element and wires connected to the temperature sensor extending through the interior bore and separately terminating at first and second distal positions along the length of the elongated tube such that the end point of the heating element and the temperature sensor are separated axially along the axis of the bore of the nozzle by a distance of at least about 0.125 inches.

In such an embodiment, the elongated tube is typically wound around the nozzle extending along the axis of the bore of the nozzle. Also in such an embodiment, the elongated tube can be mounted within a sheath of a thermally conductive material that is attachably cast onto and around the outside surface of the nozzle. Alternatively in such an embodiment, the elongated tube can be mounted around an outside surface of a heating tube, the heating tube being comprised of a tubular wall of thermally conductive material that forms an interior mounting bore having a configuration that readily receives the outer surface of the nozzle and is readily removable from the outer surface of the nozzle. In such an alternative embodiment, the elongated tube can be mounted within a sheath of a thermally conductive material that is attachably cast onto and around the outside surface of the tubular wall of the heating tube.

In another embodiment, the heating device and the temperature monitor are mounted around an outside surface of a heating tube, the heating tube being comprised of a tubular wall of thermally conductive material that forms an interior mounting bore having a configuration that readily receives the outer surface of the nozzle and is readily removable from the outer surface of the nozzle. In such an embodiment, the heating device and the temperature sensor are typically mounted within a sheath of a thermally conductive material that is attachably cast onto and around an outside surface of the tubular wall of the heating tube. Also in such an embodiment, the thermal insulator is typically disposed between the end point of the heating element and the temperature sensor such that heat transfer between the end point of the heating element and the temperature sensor is substantially reduced. Also in such an embodiment, the thermal insulator is disposed between the end point of the heating element and the temperature sensor such that heat transfer between the end point of the heating element and the temperature sensor is substantially reduced. Also in such an embodiment, the thermal insulator is preferably comprised of a material having a thermal conductivity of about 10 watts/meter-Kelvin or less and the thermally conductive material of the sheath has a thermal conductivity of greater than about 150 watts/meter-Kelvin.

In another embodiment of the invention, the heating device and the temperature sensor can be mounted within a sheath of a thermally conductive material that is attachably cast onto and around the outside surface of the nozzle.

In embodiments where the heater device and the sensor are disposed within an elongated mounting tube that is mounted around an outside surface of a heating tube, the heating tube being comprised of a tubular wall of thermally conductive material that forms an interior mounting bore having a configuration that readily receives the outer surface of the nozzle and is readily removable from the outer surface of the nozzle.

In embodiments where the temperature monitor is mounted around or on a heater tube, the temperature monitor can comprise wires connected to the temperature sensor, the wires penetrating through the tubular wall of the heating tube such that the temperature sensor is disposed within the interior mounting bore of the heating tube. In such an embodiment, the temperature sensor is preferably mounted on or within a thermal insulator that arranges the temperature sensor in a position that is in close adjacency to the outside surface of the nozzle which the heater tube is mounted around.

In another embodiment of the invention, the heating element is disposed within a first elongated tube comprising a thin-walled sheath, an interior bore and having a length, the temperature sensor is disposed within a second elongated tube comprising a thin-walled sheath, an interior bore and having a length, the thin-walled sheaths of the first and second elongated tubes being comprised of a thermally conductive material, the first and second elongated tubes being mounted on or around the nozzle, the heating element and the temperature monitor extending through the interior bores respectively of the first and seconds elongated tubes and separately terminating at first and second distal positions along the length of the first and second elongated tubes such that the end point of the heating element and the temperature sensor are separated axially along the axis of the bore of the nozzle by a distance of at least about 0.125 inches and a thermal insulator is disposed between the end point of the heating element and the temperature sensor such that heat transfer between the end point of the heating element and the temperature sensor is substantially reduced. In such an embodiment, the first and second elongated tubes can be mounted within a sheath of a thermally conductive material that is attachably cast onto and around the outside surface of the nozzle or a heater tube that is mounted on or around the nozzle.

In another embodiment of the invention, there is provided an apparatus for measuring the temperature of a nozzle having fluid material injected from an injection molding machine through a flow channel in a heated manifold that is coupled to a nozzle that is coupled to the cavity of a mold, the apparatus comprising:

a heating device comprising a controllably heatable thermally conductive heating element;

the nozzle comprising a tube of thermally conductive material having an outer surface and an inner surface defining a central flow bore having an axis extending from an upstream end to a downstream end of the flow bore, the flow bore being coupled to the flow channel of the manifold and the cavity of the mold;

the heating element of the heating device being mounted on or around the outer surface of the tube of the nozzle such that heat is transferable between the heating element and the outer surface of the thermally conductive nozzle, the heating element extending along the axis of the flow bore of the nozzle to an end point of the heating element;

a temperature monitor having a length and terminating at a distal end in a temperature sensor, the temperature monitor being mounted on or around the nozzle such that the temperature sensor is mounted at a position that is thermally isolated from the end point of the heating element;

a thermal insulator disposed between the end point of the heating element and the temperature sensor, the thermal insulator being comprised of a material having a thermal conductivity of about 10 watts/meter-Kelvin or less;

the temperature sensor being mounted on or around the nozzle such that the temperature sensor is spatially separated from the end point of the heating element by at least about 0.125 inches.

In another embodiment of the invention there is provided, an apparatus for measuring the temperature of fluid material injected from an injection molding machine through a flow channel in a heated manifold that is coupled to a nozzle that is coupled to the cavity of a mold, the apparatus comprising:

a nozzle comprising a tube of thermally conductive material having an outer surface and an inner surface defining a central flow bore having an axis extending from an upstream end to a downstream end of the flow bore, the flow bore being coupled to the flow channel of the manifold and the cavity of the mold;

a heated body of thermally conductive material mounted on, around or to the outer surface of the tube of the nozzle such that heat is readily transferable between the heated body and the outer surface of the thermally conductive nozzle, the heated body comprising a heated body portion and a selected body portion;

a temperature sensor mounted on, around or in close adjacency to the selected body portion;

a thermal insulator disposed between the heated body portion and the selected body portion, the thermal insulator substantially reducing thermal conductive communication between the heated body portion and the selected body portion.

In such an embodiment, the heated body preferably comprises one or a combination of (a) a heating tube comprised of a tubular wall of thermally conductive material that forms an interior mounting bore having a configuration that readily receives the outer surface of the nozzle and is readily removable from the outer surface of the nozzle, (b) a sheath of thermally conductive cast material attached to an outer surface of the heating tube and (c) a sheath of thermally conductive cast material attached to the outer surface of the nozzle.

Also in such an embodiment, the selected body portion preferably comprises one or more of (i) a thermally isolated portion of the sheath of cast material attached to the outer surface of the heating tube, (ii) an interior surface of the tubular wall of the heating tube, (iii) a thermally isolated portion of the sheath of cast material attached to the outer surface of the nozzle.

In all of the embodiments of the invention, the thermal insulator is preferably comprised of a material having a thermal conductivity of about 10 watts/meter-Kelvin or less and the thermally conductive material of the sheath has a thermal conductivity of greater than about 150 watts/meter-Kelvin. And the heater end point HEP is preferably distanced from the sensor point by at least about 0.125 inches.

BRIEF DESCRIPTION OF THE DRAWINGS

The above and further advantages of the invention may be better understood by referring to the following description in conjunction with the accompanying drawings in which.

DETAILED DESCRIPTION

Figure 1:
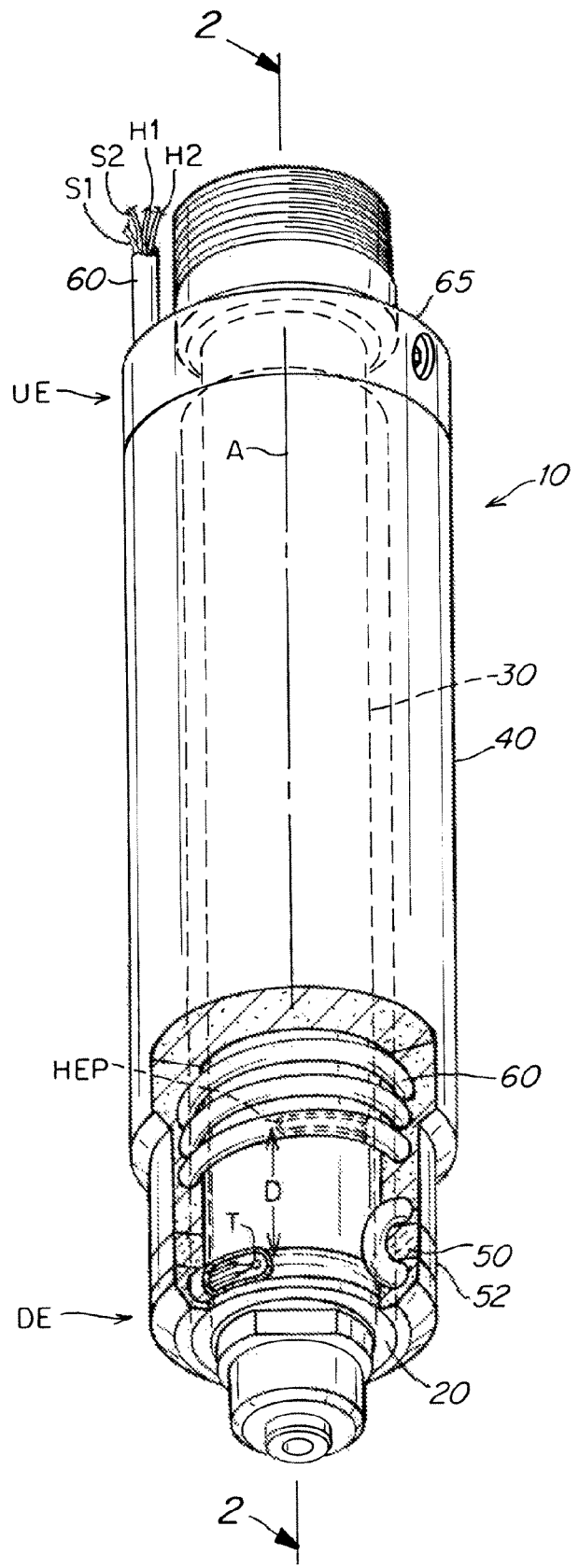
FIG. 1 is a perspective cut-away view of one embodiment of a fluid material heating and temperature measuring apparatus according to the present invention.
Figure 2:
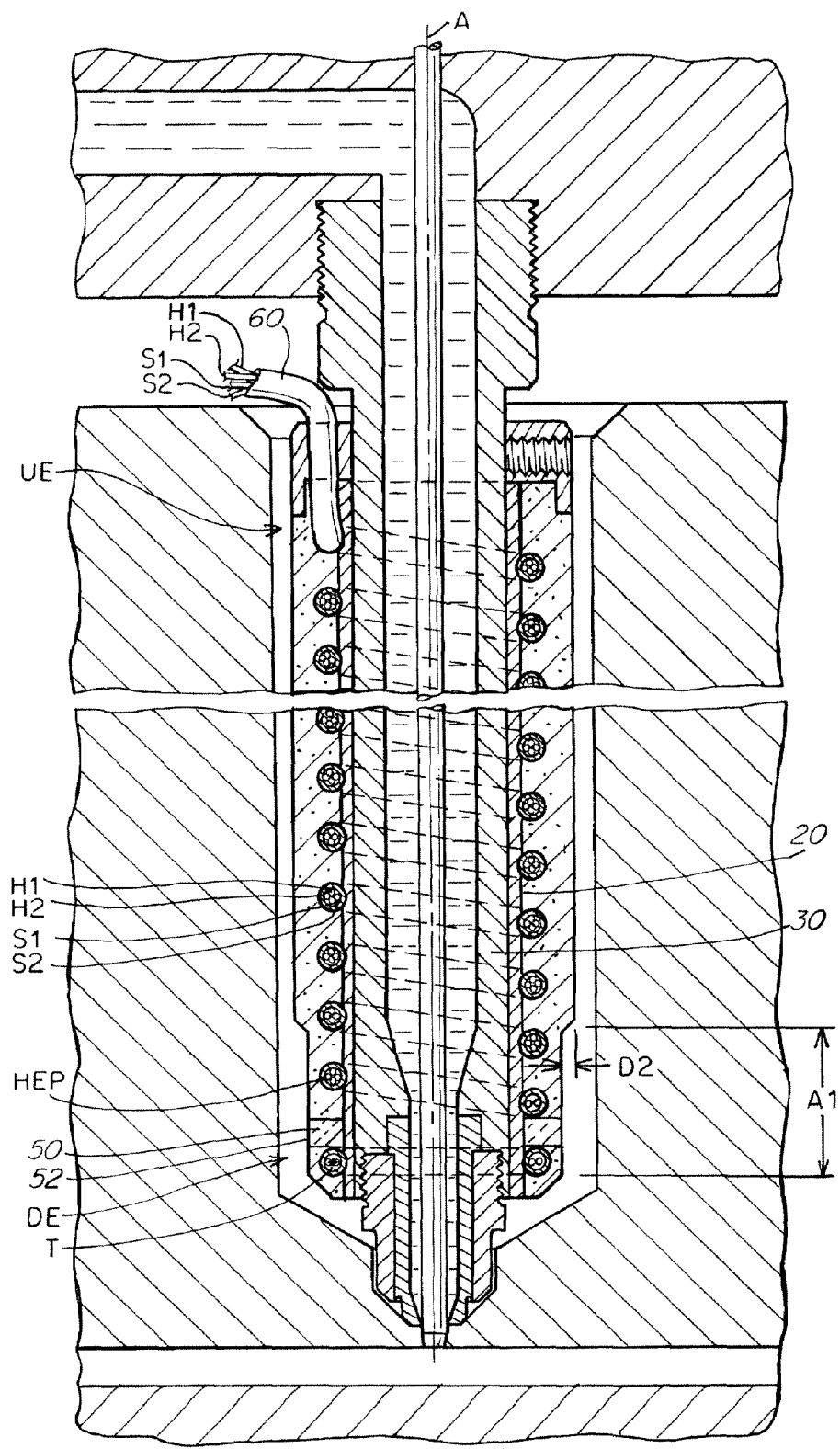
FIG. 2 is a cross-sectional view along lines 2-2 of FIG. 1
Figures 3, 4:
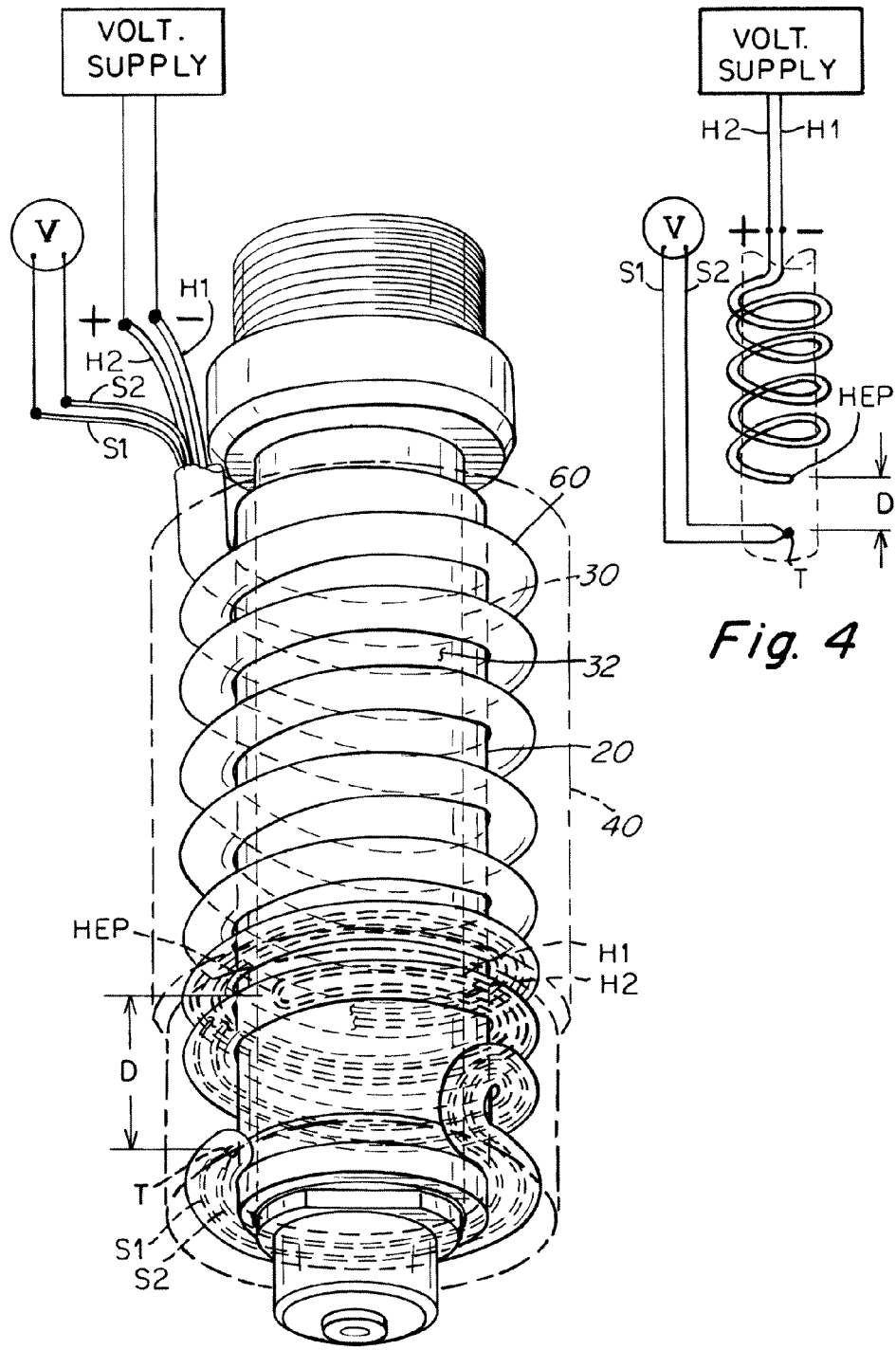
FIG. 3 is a partially schematic, perspective view of the apparatus shown in FIG. 1.
FIG. 4 is schematic view of the temperature monitor, sensor and heating device components of the FIGS. 1-3 apparatus.

FIGS. 1-3 show one embodiment of a heater and temperature measuring or monitoring apparatus 10 according to the invention. The apparatus comprises a heater device H1, H2, Volt Supply, a temperature monitor device, S1, S2 and voltmeter designated as V in FIG. 3 and an elongated mounting tube 60 comprised of a thin-walled sheath of highly thermally conductive material typically a metal material such as steel, copper or the like. The mounting tube 60 houses both the heater wires H1, H2 and the temperature monitor wires S1, S2 which extend substantially throughout the length of the interior bore of the mounting tube 60. As shown in FIG. 2, the mounting tube 60 wraps spirally around the outside surface of the walls of a heater tube 20 which itself receives and fits around the outer surface of a tubular nozzle body 30. The heater tube 20 readily receives the nozzle 30 and is readily removable therefrom such that the heater tube 20 together with its associated components 60, S1, S2, H1, H2 is readily installable on and removable from the nozzle body 30.

As shown in FIGS. 1, 2, the heater wires H1, H2 extend along the axis A of the nozzle 30 from the upstream end UE toward the downstream end DE of the nozzle 30 throughout the length of the elongated mounting tube 60 terminating in a heater end point HEP that is axially distanced a selected distance D, FIG. 1, from the terminal temperature sensor point T of the temperature sensor wires S1, S2. In the embodiment shown in FIGS. 1-3, a sheath of highly thermally conductive cast material 40 such as aluminum is attached to the outside surface 32 of the heater tube 20. The cast aluminum sheath 40 embeds the elongated mounting tube 60 within its matrix or body and thus serves to transmit heat emitted by the heater wires H1, H2 from the tube 60 more evenly along a substantial length of the axial length of the heater tube 20 and the tubular nozzle body. As shown in FIGS. 1-3, the thickness or diameter of the cast sheath 40 is turned down or reduced by a distance D2 along a selected length A1 at the distal end of the nozzle 30 and heater tube 20. The thickness or diameter of the sheath 40 is turned down at least enough by a distance D2 to expose the outer surface 52 of the thermal insulator 50 to air such that the sheath material does not extend axially in a continuous matrix from the upstream end of the insulator past the insulator to the downstream side of the insulator such that the terminal sensor point T is thermally isolated from the upstream portion of the matrix of the cast-sheath material 40. Such thermal and spatial isolation of the sensor T enables the sensor to better sense the actual temperature of its surrounding environment rather than be influenced by the temperature of the sheath 40 or other components of the apparatus that are disposed upstream of the location of the thermal insulator 50. The more accurate the temperature reading at the precise location the sensor point T, the more accurate is the temperature that is assigned to the nozzle, the heater tube and/or the fluid material that is flowing through the nozzle at the precise location of the sensor point T.

The function of the thermocouple or other temperature monitor is to provide a real-time measurement of the temperature of the environment that immediately surrounds and/or is in contact with the sensor point including the heater tube 20 (if used), the nozzle and the fluid material flowing through the nozzle at the location of the sensor point T. The real-time temperature measurement of temperature can then be used activate or deactivate a heating device to raise or lower the temperature of one or more components of the apparatus so as to control the temperature of the fluid material flowing through the nozzle and/or the manifold.

In the embodiment shown in FIGS. 1-3, the temperature monitor comprises a thermocouple which typically comprises two elongated wires S1, S2 each separately comprised of two different metal materials that are mated in contact with each other at a selected distal terminal sensor point T. Because of the difference in composition of the two wire materials S1, S2, a measurable voltage is generated between the wires that is dependent on the temperature of the environment with which the mated wires T is/are in contact thus enabling the user to measure the temperature of the environment in the immediate vicinity and in contact with the temperature sensor point T. The heater device as shown typically comprises an electrically conductive wire(s) H1, H2 to which an electrical current having a variably selectable current and/or voltage (Volt Supply) can be applied to controllably and variably adjust the temperature to which the wire or wires can be raised or lowered, the electricity heating the wire(s) via the resistance of the metal wires to electrical energy that is applied.

Figures 5A, 5B:
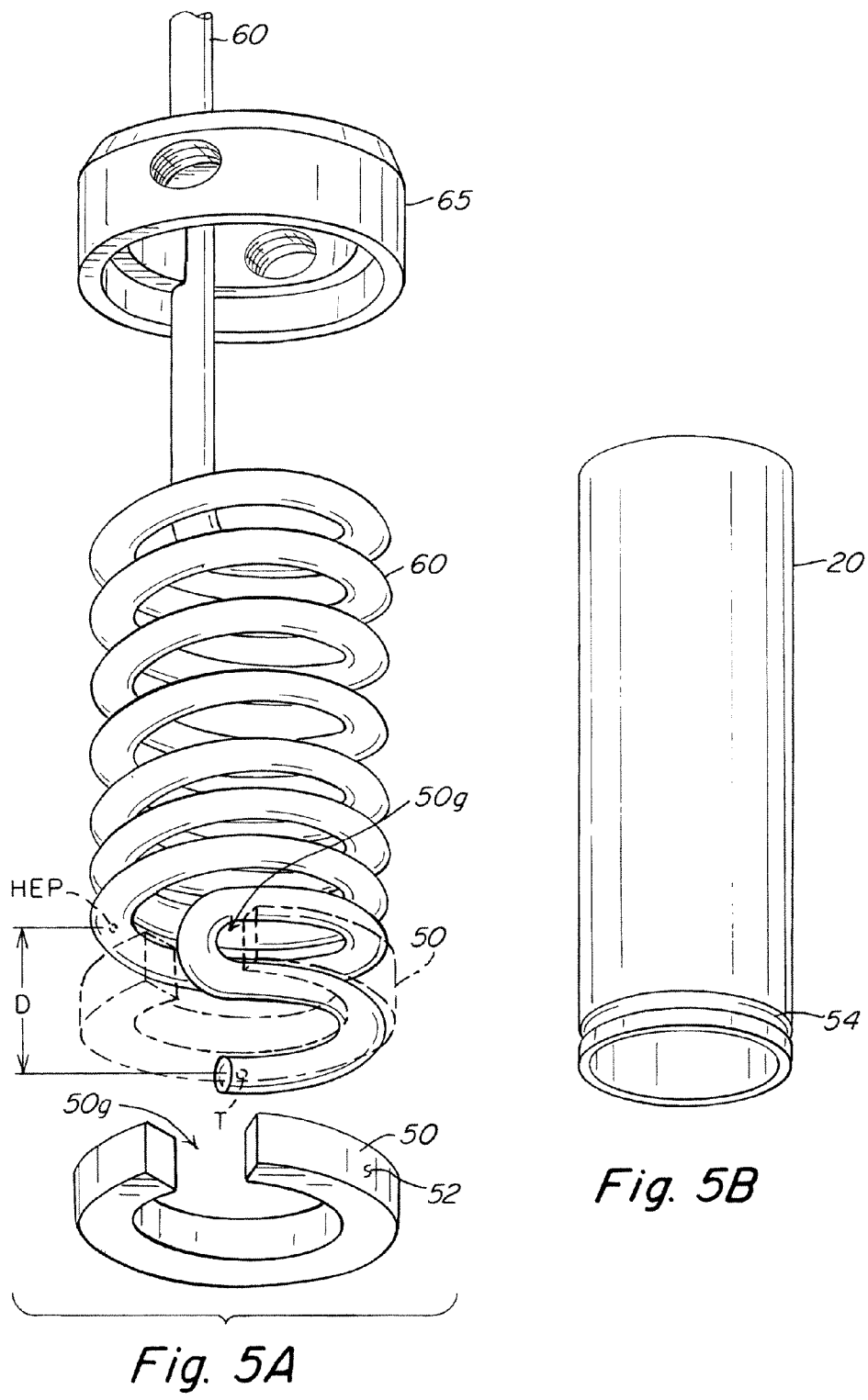
FIG. 5A is an exploded partially schematic view of the elongated tubular sheath, insulator and cap components of the FIG. 1 apparatus.
FIG. 5B is a perspective view of the heating tube component of the FIG. 1 apparatus.

FIG. 5A shows the elongated mounting tube 60 separate from the nozzle and heater tube components having a spiral configuration with the thermal insulator 50 disposed/mounted in a groove between successive spiral arms of the mounting tube 60. As shown in FIGS. 3 and 5B when the heater tube 20 on which the cast sheath 40 is attached is employed, the distal portion of mounting tube 60 containing the sensor point T is disposed within a groove 54 formed within the body of the heater tube 20. The position of the insulator 50 is that it is disposed axially between the end point of the heater HEP and the sensor point T. The end point of the heater HEP and the sensor point T are preferably spaced a distance D of about 0.125 inches or greater away from each other in the axial direction along the axis A of the nozzle. Preferably the distance D is between about 0.125 and about 0.5 inches and most preferably between about 0.125 and about 0.375 inches.

Figure 6:
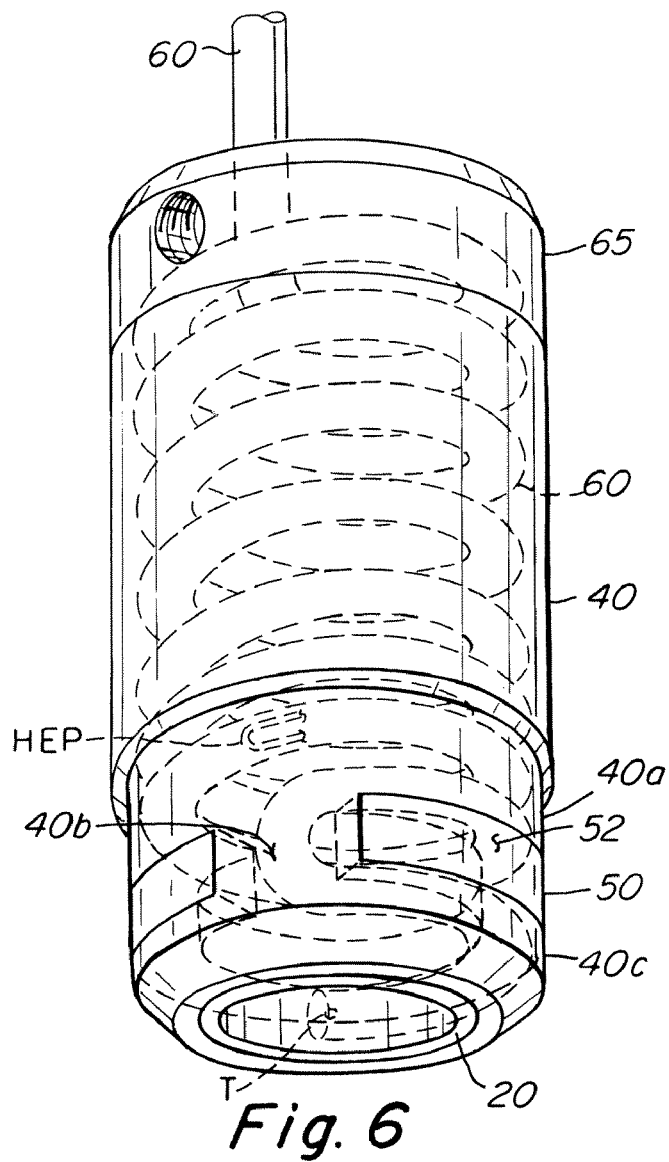
FIG. 6 is a perspective view of the FIG. 1 apparatus showing the relationship of the cast-sheath portion of the apparatus relative to the outside surface of the heater tube, nozzle and other components with the cast-sheath being turned down at its distal end to expose the outer surface of the insulator component such that heat is not transferred readily through the cast-sheath from the upstream to the downstream end of the insulator component.
Figure 6A:
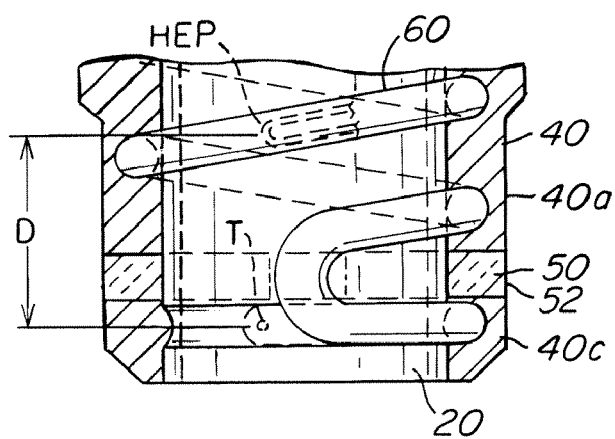
FIG. 6A is a schematic side cross-sectional view of the distal end of the apparatus of FIG. 1.
Figure 7:
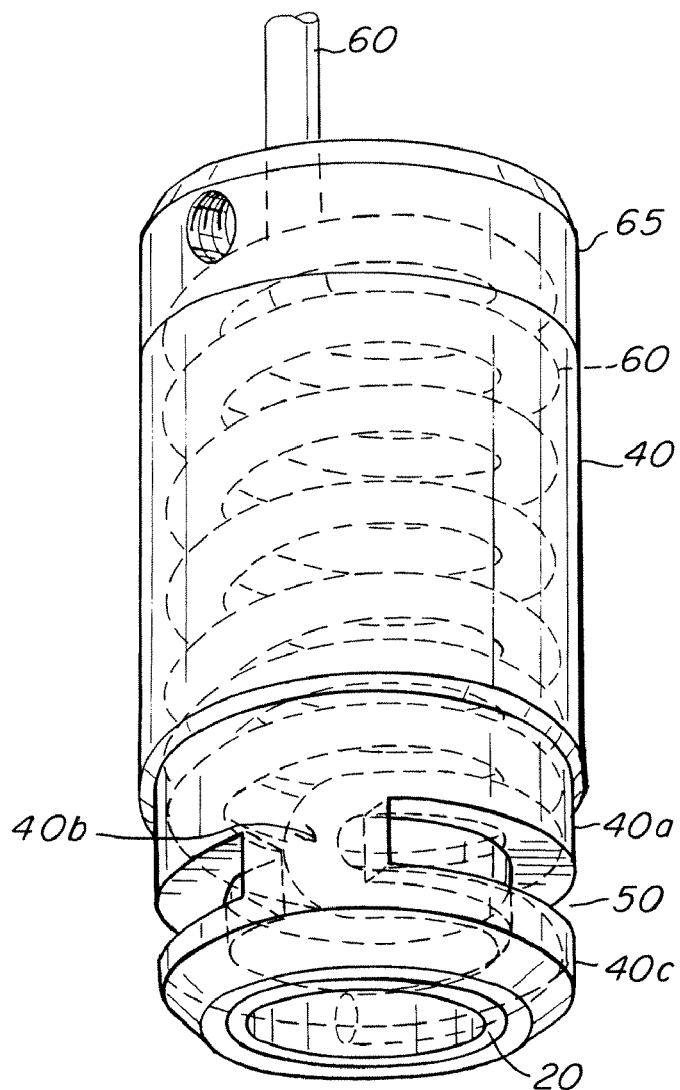
FIG. 7 is a view similar to FIG. 6 showing an air gap as comprising the thermal insulator of the FIG. 1 apparatus, the air gap separating the temperature sensor and end point of the heating element.
Figure 7A:
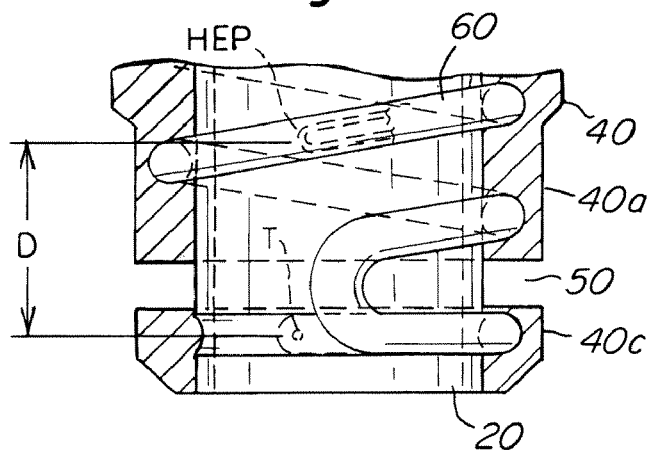
FIG. 7A is a schematic side cross-sectional view of the distal end of the apparatus of FIG. 7 apparatus.

The insulator 50 is comprised of a material that is relatively non-thermally conductive such as a ceramic material, titanium, air or a fiberglass reinforced mineral filled material. The insulator typically has thermal conductivity of about 10 Watts/meter-Kelvin or less. The cast-sheath 40 material typically has a thermal conductivity of greater than about 150 Watts/meter-Kelvin and most preferably about 200 Watts/meter-Kelvin or more. As shown in FIGS. 6, 6A, the outside circumferential surface 52 of the insulator 50 is exposed to ambient air and thus the end point of the heater HEP is thermally separated from the temperature sensor T along the axis A of the nozzle by the disposition of the insulator 50 therebetween. In the FIGS. 6, 6A embodiment, the insulator comprises a solid material. In the embodiment shown in FIGS. 7, 7A, the insulator 50 comprises a gap of air. In both of these embodiments as shown, the thermal insulator 50 is mounted on or to the heated body of cast material 40 and/or the heated body of the heater tube 20 in an arrangement that, except for a small portion 40b of the cast material residing in a circumferential gap 50g of the insulator 50, substantially separates physical engagement or contact between the upstream heated body portion 40a of the cast material (and its associated tube 20) and the downstream selected body portion 40c of the cast material (and its associated heater tube 20) which the sensor T is in immediate adjacency to and/or contact with. Such substantial physical separation results in substantial thermal isolation and/or separation of the sensor T from the much larger heated body portions 40a of the cast material and its associated upstream heated portions of the heater tube 20.

Figure 8:
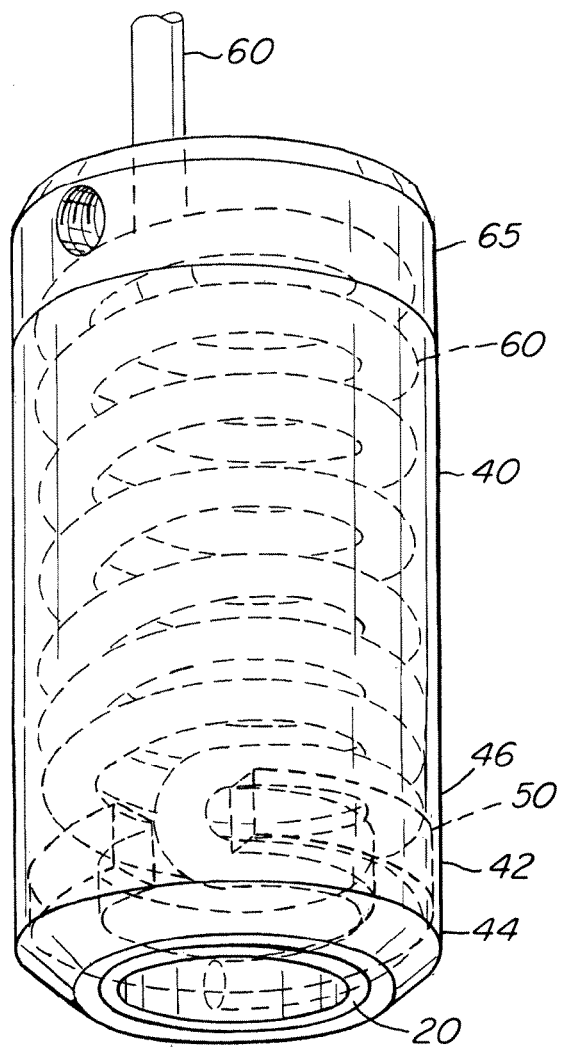
FIG. 8 shows a view similar to FIGS. 6, 7 with the cast sheath not being turned down such that the cast-sheath extends axially past and over the outer the surface of the insulator component.
Figure 8A:
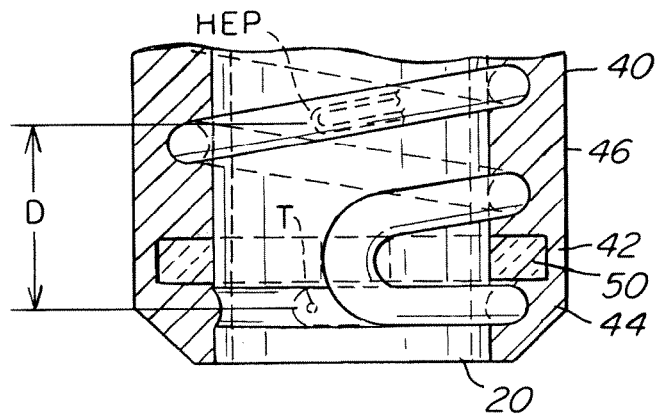
FIG. 8A is schematic side cross-sectional view of the distal end of the apparatus of FIG. 8 apparatus.

In the embodiment shown in FIGS. 8, 8A, the cast sheath material 40 extends as an axially continuous matrix of material 42 between the axially upstream portion 46 of the sheath 40 and the axially downstream portion 44 of the sheath of cast material. In this embodiment, the insulator 50 which is embedded within the matrix 40 and is not exposed to ambient air does not insulate the temperature sensor T from the axially upstream heated portion of the sheath 40 as in the embodiments of FIGS. 1-7 because heat can be transferred more readily between the axially upstream portion 46 and the axially downstream portion 44 of the sheath of cast material 40 via the intermediate portion 42 that connects or thermally communicates heat therebetween.

Figure 9:
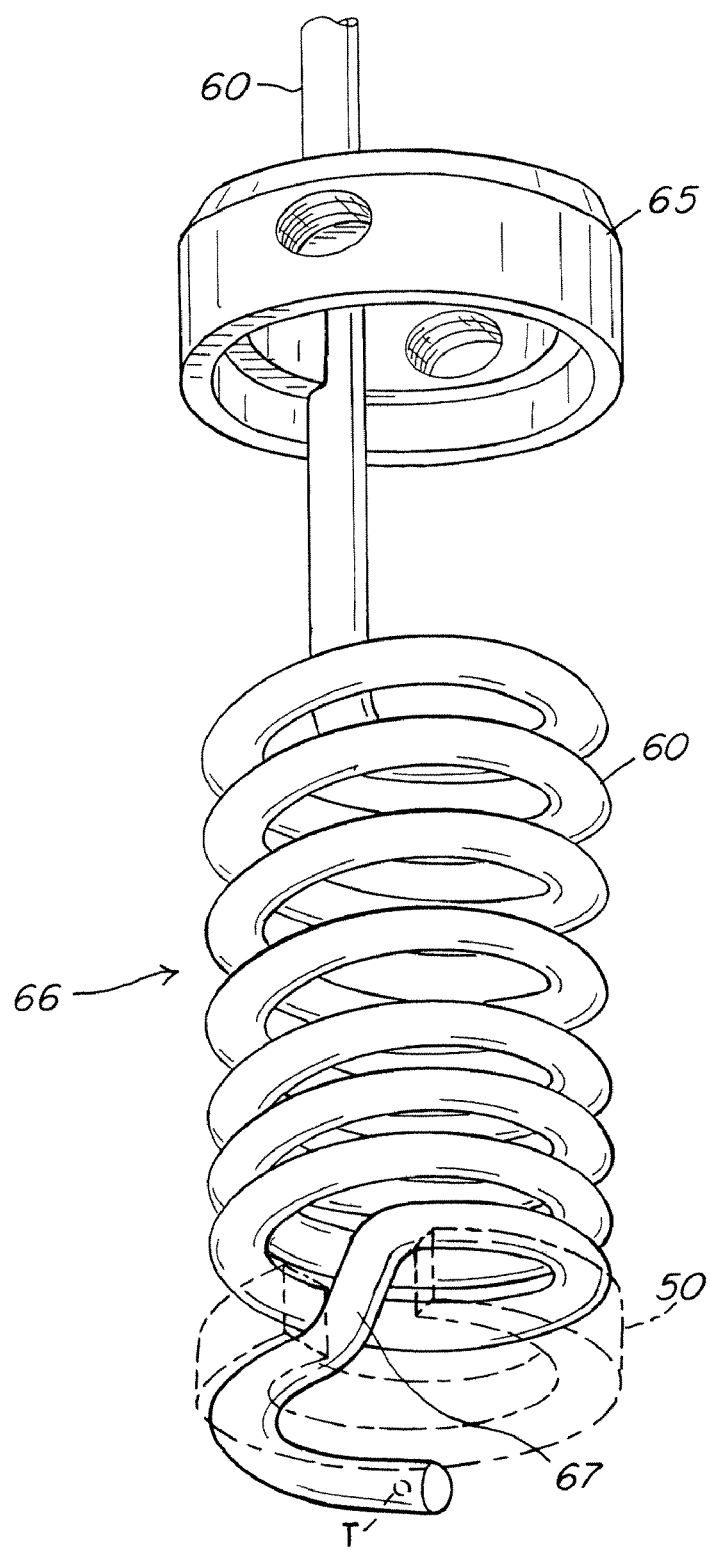
FIG. 9 is an exploded perspective view of an alternative configuration for the elongated tube component of the FIG. 1 apparatus.
Figure 10:
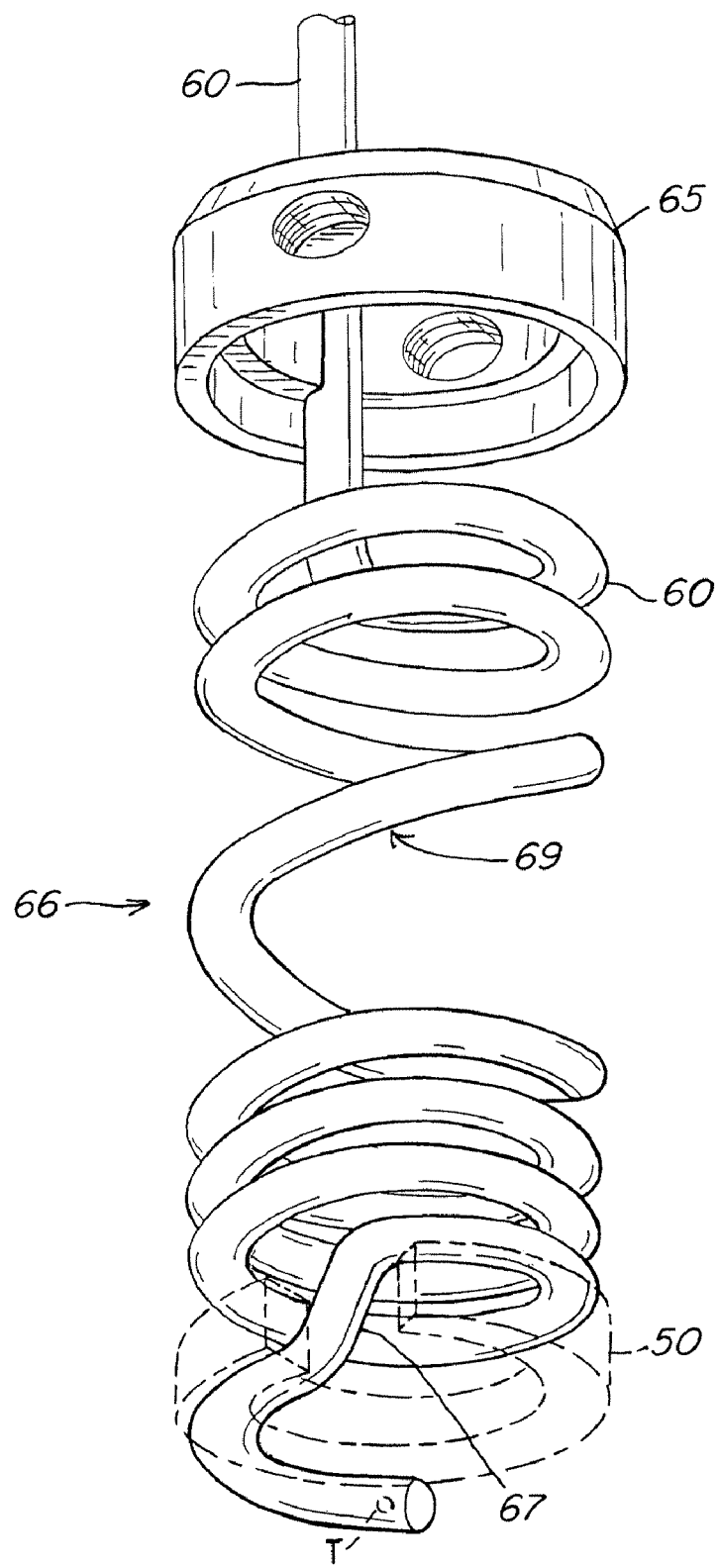
FIG. 10 is an exploded perspective view of another alternative configuration for the elongated tube component of the FIG. 1 apparatus.

As can be readily imagined, the specific shape or configuration of the spiral portion 66 of the elongated mounting tube 60 can take any one of a great number of specific geometric configurations, the specific configuration of the portion 67, 69 of the mounting tube 60 shown in FIGS. 9, 10 being different from the configurations shown in FIGS. 1-8.

In preferred embodiments the elongated mounting tube 60 is wrapped several times around the outside circumference of the heater tube 20 and the nozzle 30 along a substantial portion or all of the axial length of the axis A heater tube and/or nozzle 30. In all of the FIGS. 1-10 embodiments, the heater elements or wires H1, H2 are housed/contained within the same elongated mounting tube 60 as the temperature sensing wires S1, S2.

Figure 11:
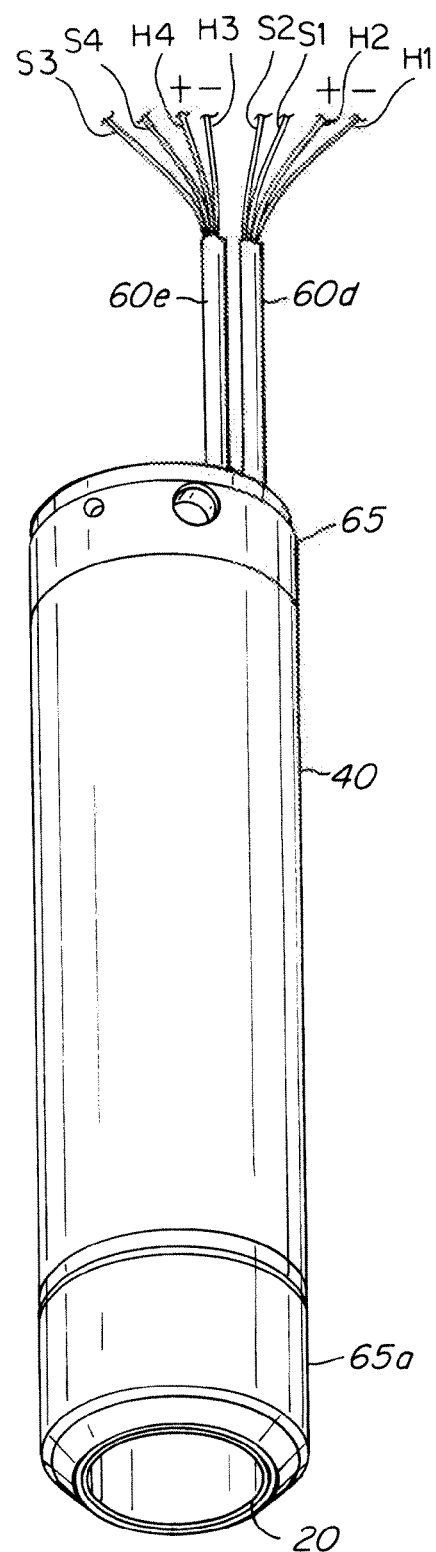
FIG. 11 is a bottom perspective view of another alternative embodiment of the invention showing a cast aluminum sheath attachably applied to the outer surface of a removable heater tube, the cast-sheath being turned down at its distal end to expose the outer surface of the insulator component, there also being two redundant elongated mounting tubes each containing both a heating device and a temperature monitor.
Figure 12A:
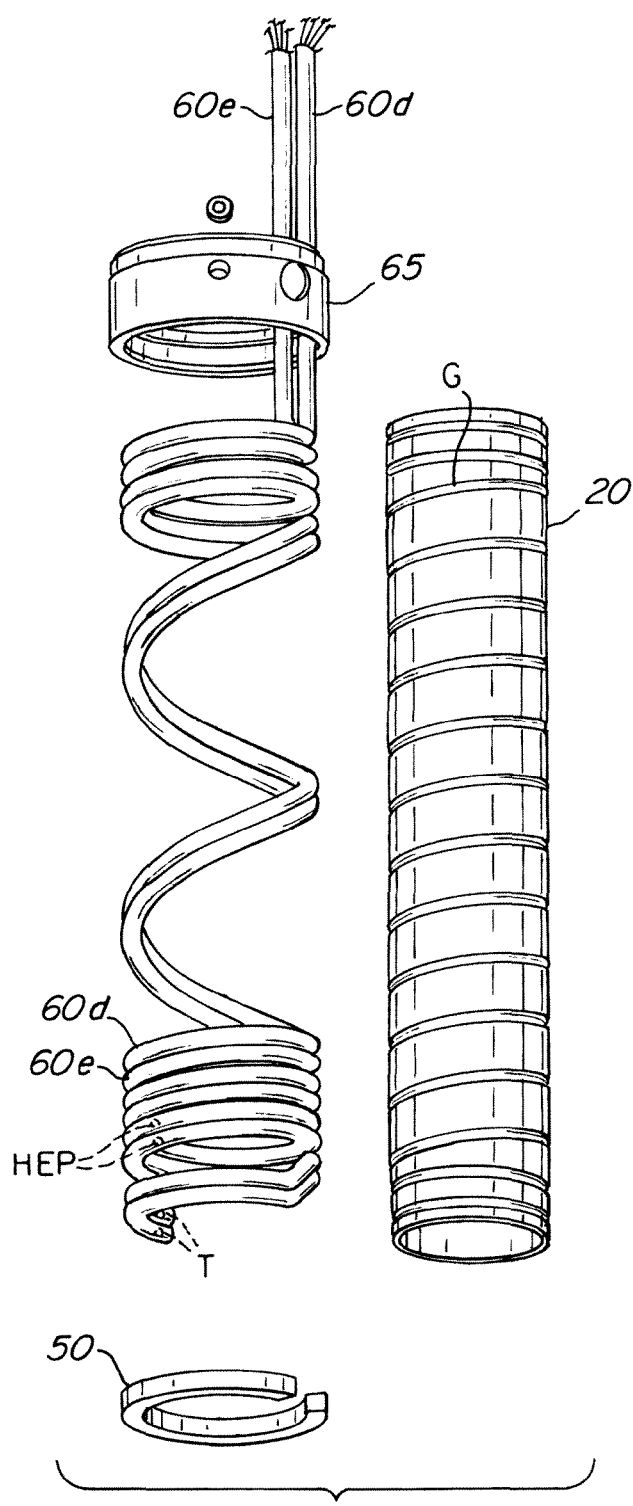
FIG. 12A is a bottom exploded view of the FIG. 11 apparatus showing grooves in the outer surface of the heater tube for better enabling attachment of the cast-sheath material to the outside surface of the heater tube and showing the relationship in arrangement and mounting of the two redundant elongated mounting tubes.
Figure 12B:
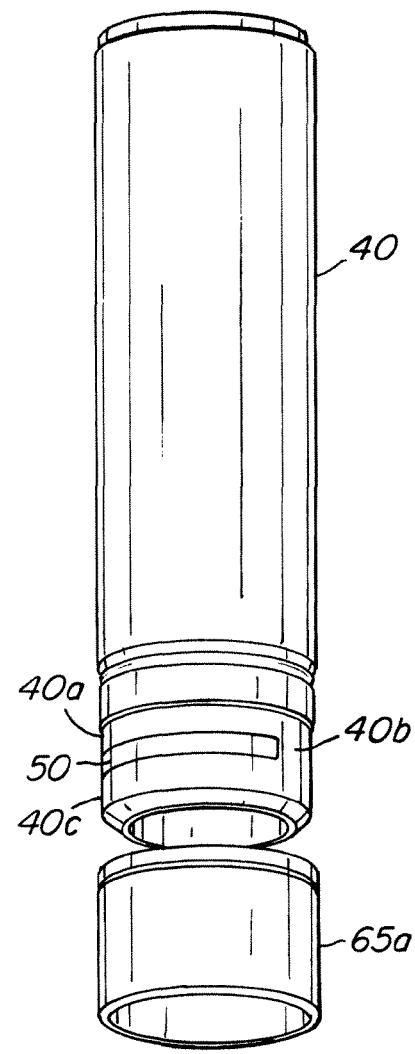
FIG. 12B is bottom end partially exploded view of the FIGS. 11, 12A apparatus showing an end tube component for covering the outside surface of the turned down distal end of the cast-sheath.

FIGS. 11, 12A, 12B show another embodiment of the invention where a redundant pair of elongated mounting tubes 60d, 60e each separately containing a set of heating elements H1, H2 (for 60d), H3, H4 (for 60e) and temperature sensing wires S1, S2 (for 60d), 53, S4 (for 60e). The redundant tubes 60d, 60e are both mounted around heating tube 20 and embedded within a cast-sheath of aluminum 40 as shown. The purpose of providing such redundancy is so that if/when one thermocouple or heater fails, the second/other heater device and temperature sensor can be activated and employed immediately in a hotrunner system without disassembly, removal and repair or replacement of the apparatus. As shown in the embodiment of FIGS. 11, 12A, 12B, the outer surface of the walls of heater tube 20 is provided a spiral groove G for better enabling attachment of the cast-sheath of material 40 to be applied and adhered to the outer surface of the tube 20. Also as shown, a proximal cap 65 is provided for purposes of mounting and attachment of the mounting tubes 60d, 60e. An distal end cap 65a comprising a cylinder is also provided for receiving the distal end of the tube 20 and its turned down portion of the cast 40a and to act as a cover for the exposed outer circumferential surface of the insulator 50.

Figure 13:
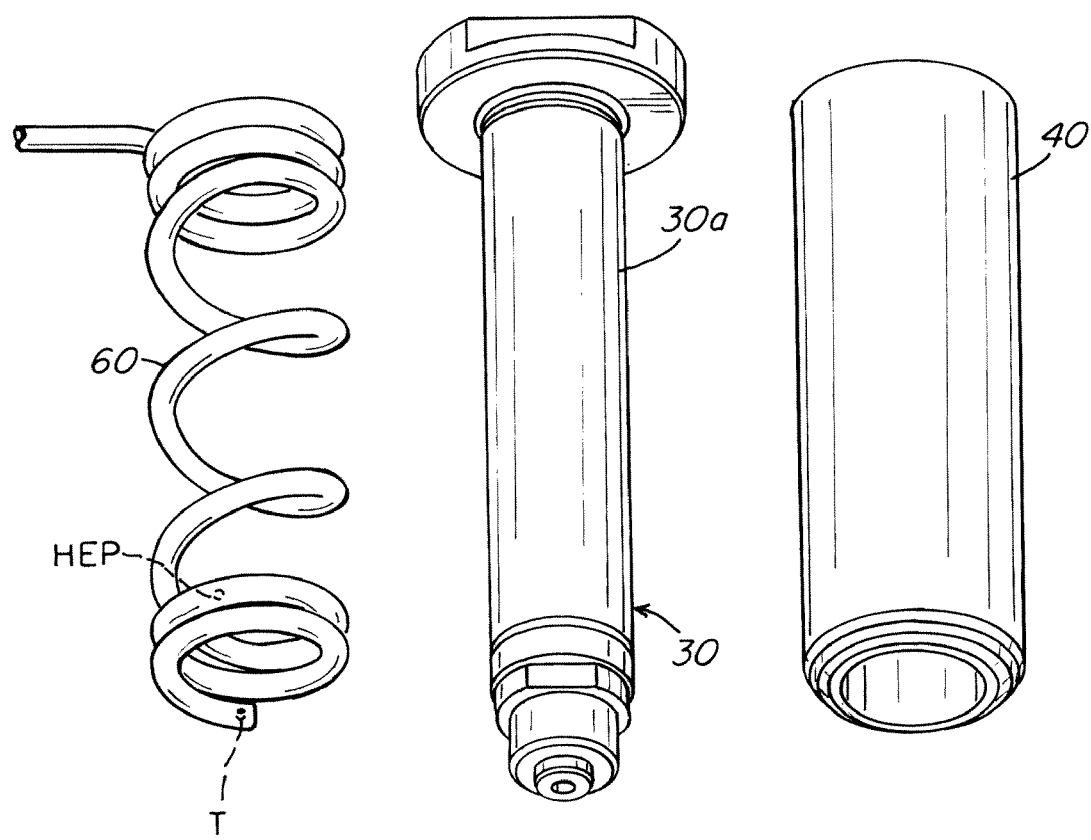
FIG. 13 is a bottom end exploded view of another alternative embodiment of the invention showing the elongated mounting tube component being mounted directly onto the outside surface of a nozzle and a cast-sheath being attachably applied directly to the outer surface of the nozzle.
Figure 14:
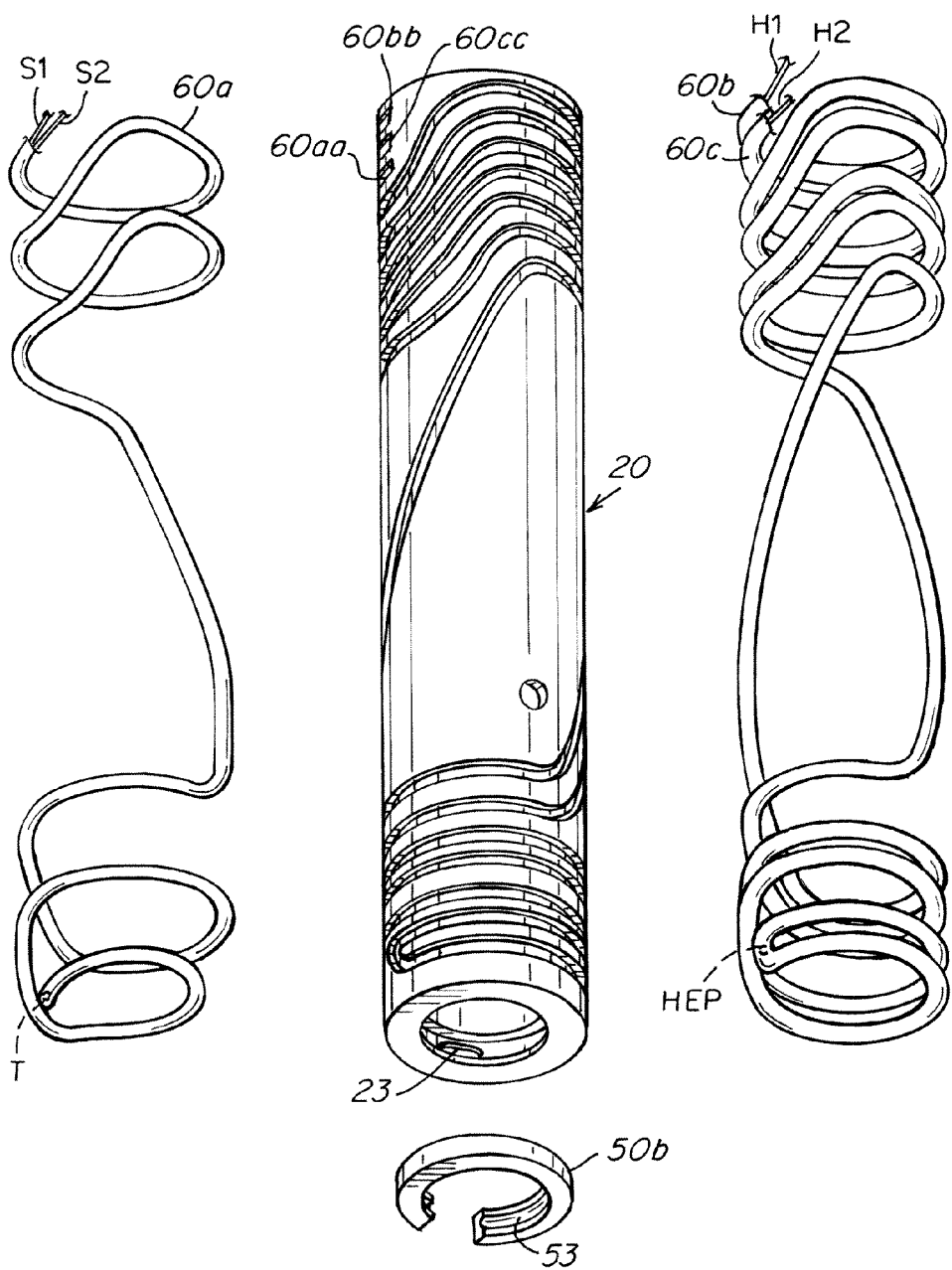
FIG. 14 is a bottom end exploded view of another alternative embodiment of the invention showing a thermal insulator mounted on the interior surface of a heater tube, the temperature sensor component of the apparatus being routed from the exterior to the interior surface of the heater tube to reside within an interior facing groove provided in the insulator component.
Figure 15:
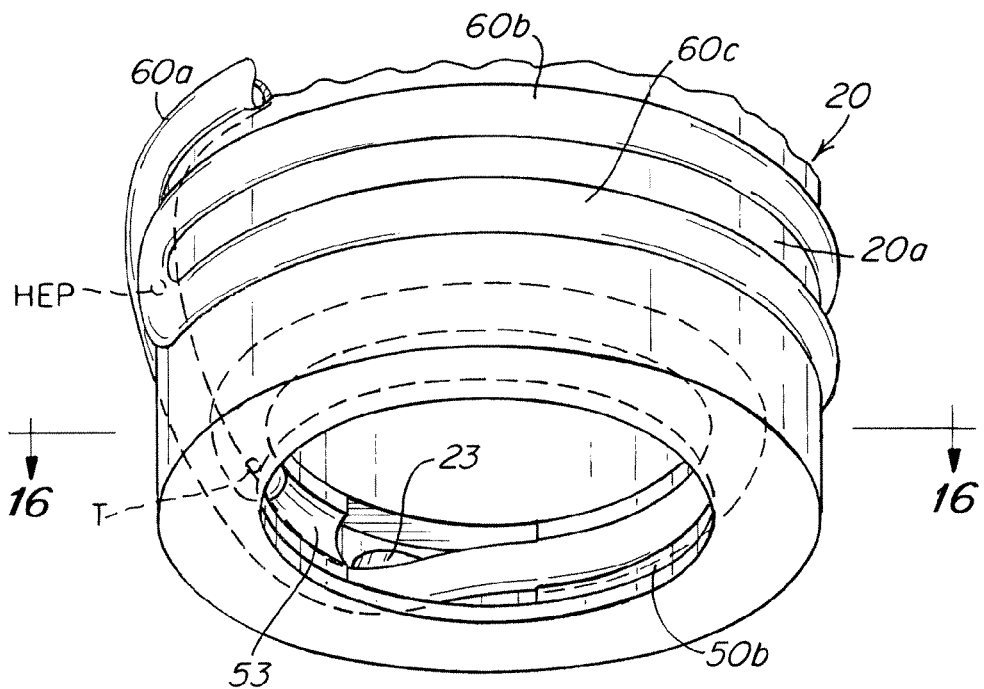
FIG. 15 is a bottom end close-up view of the distal end of the FIG. 14 apparatus.
Figure 16:
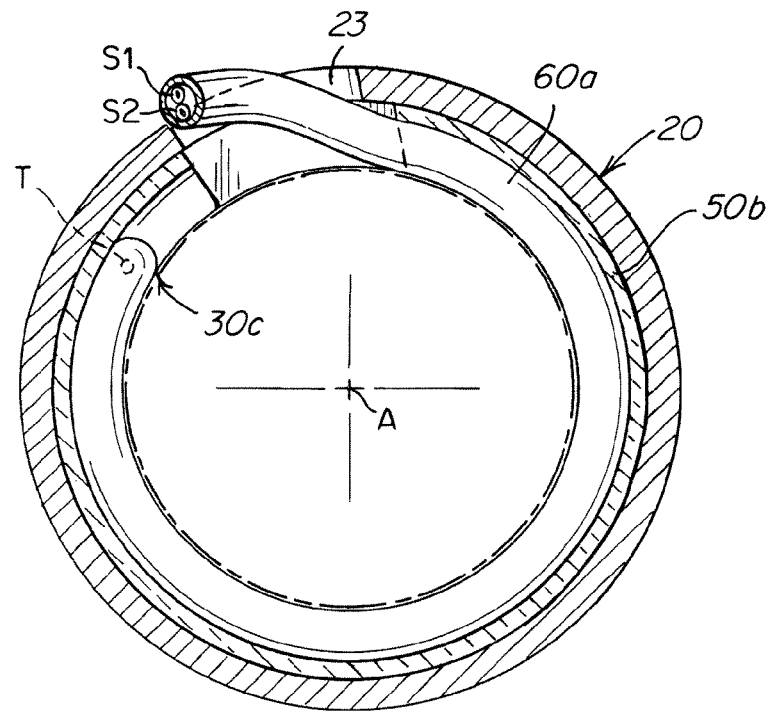
FIG. 16 is a radial cross-sectional view taken along lines 16-16 of FIG. 15.
Figure 17:
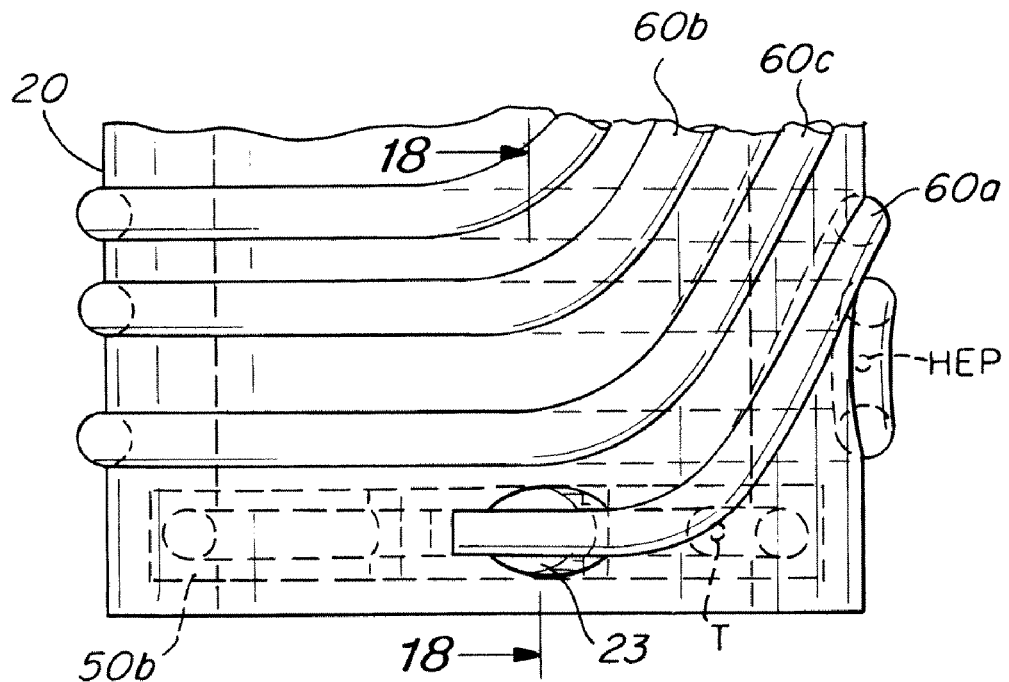
FIG. 17 is a front side schematic view of FIG. 15.
Figure 18:
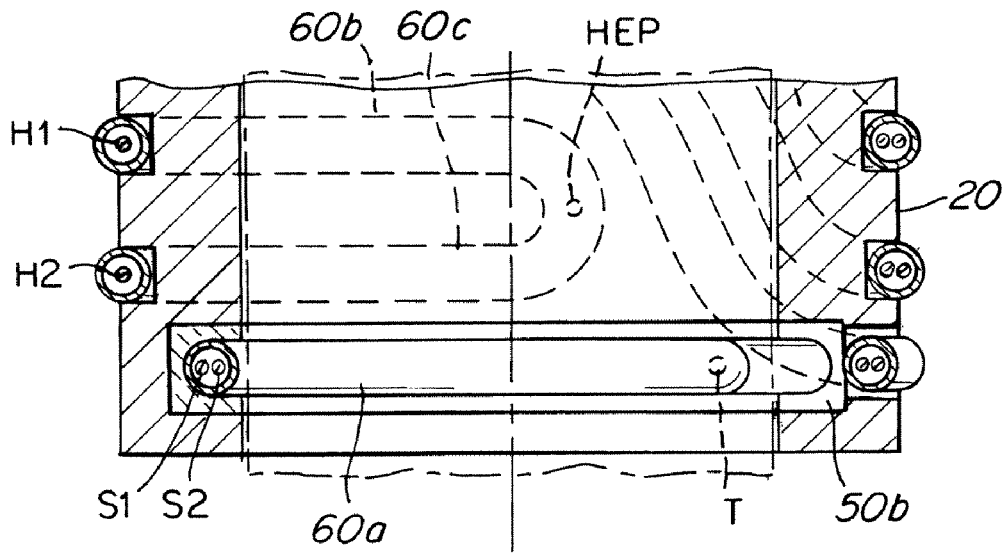
FIG. 18 is a cross-sectional side view taken along line 18-18 of FIG. 17.
Figure 19:
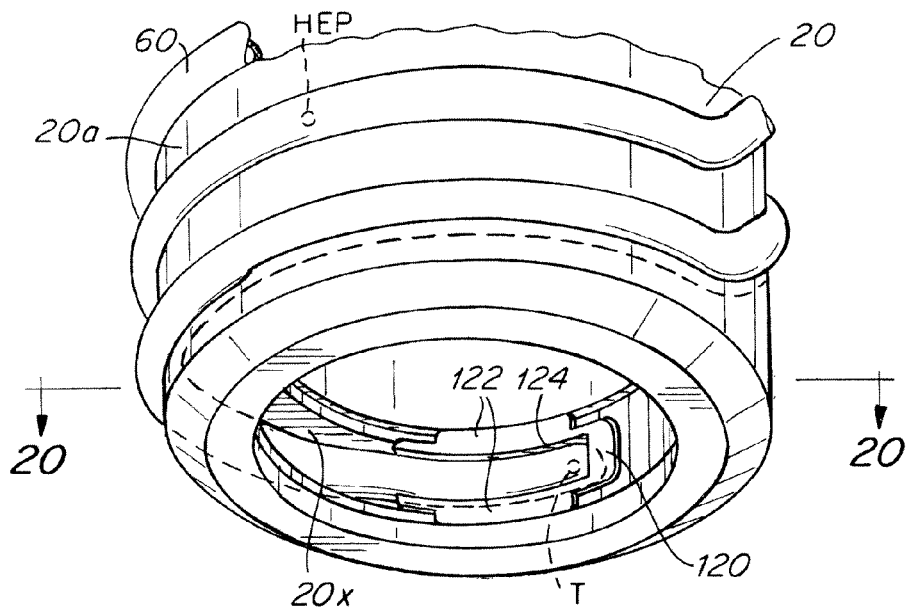
FIG. 19 is a bottom end close-up perspective view of the distal end of a heater tube component of an apparatus according to the invention showing the tip end of an elongated mounting tube containing both the heating device and temperature monitor components within a single elongated mounting tube, the tip end of the mounting tube being disposed/mounted in a thermal insulator insert that is mounted in a receiving aperture provided at the distal tip end of the heater tube.
Figure 20:
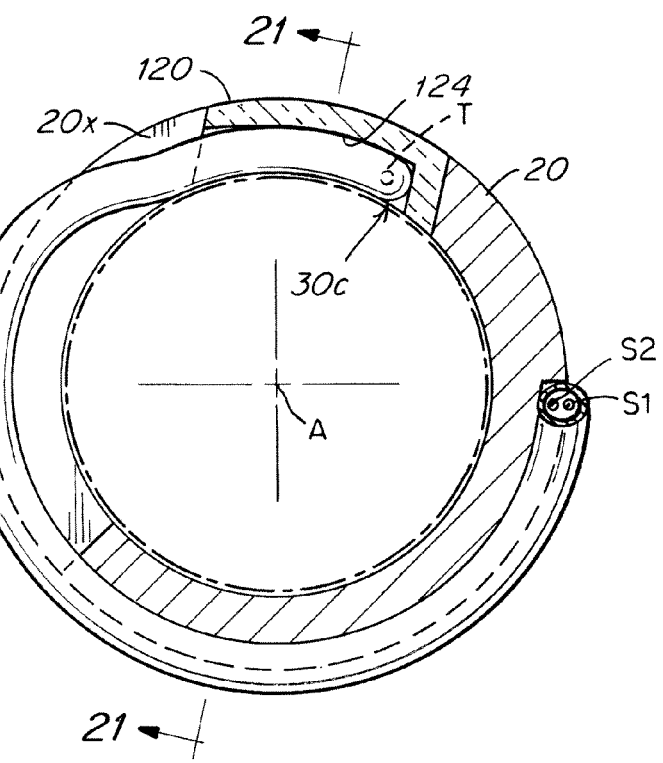
FIG. 20 is a top side schematic cross-sectional view along lines 20-20 of FIG. 19.
Figure 21:
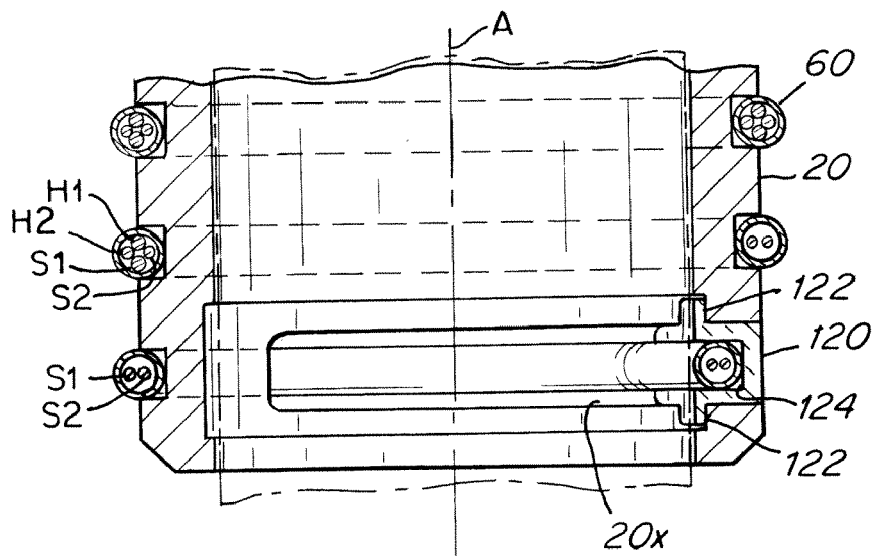
FIG. 21 is a side schematic cross-sectional view along lines 21-21 of FIG. 20.
Figure 22:
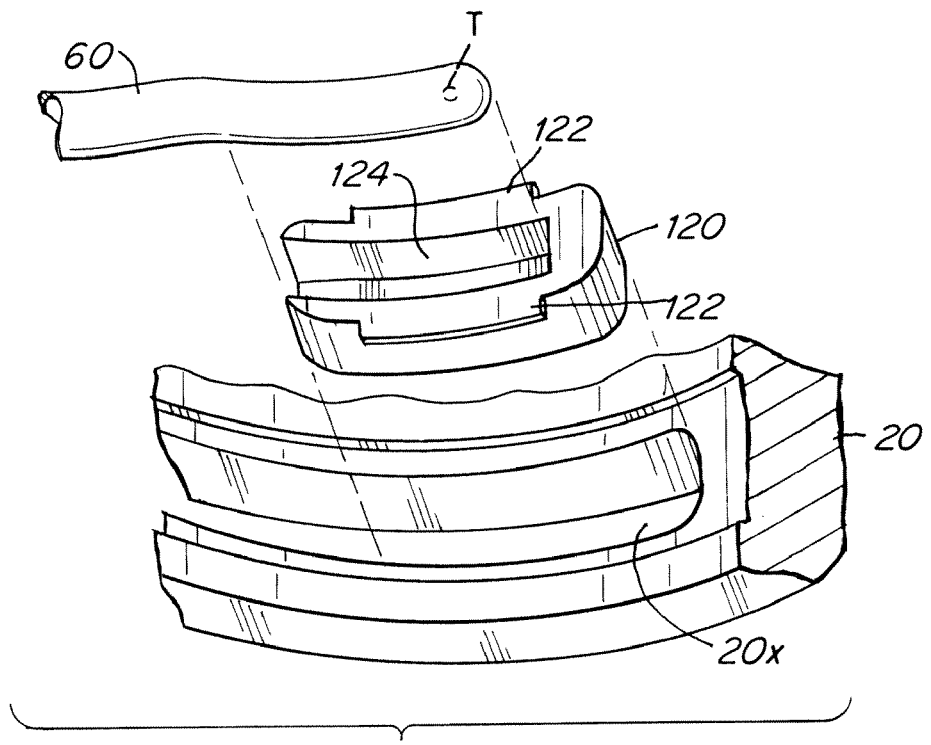
FIG. 22 is a bottom end exploded perspective view of the insert component of the FIGS. 19-21 apparatus showing the arrangement and mounting of the tip end of the elongated mounting tube within the thermal insulator insert component that is mounted within the wall of the distal end of the heater tube.

FIG. 13 shows another alternative embodiment of the invention where the cast-sheath of highly thermally conductive material 40 in which the elongated mounting tube 60 is embedded, is applied directly to the outer surface 30a of a nozzle 30 itself rather than to a heater tube, the mounting tube being mounted on and/or around the nozzle tube 30 directly without an intermediary heater tube.

FIGS. 14-18 show another alternative embodiment of the invention in which the heater elements or wires H1, H2 are disposed within/throughout first and second separate elongated mounting tubes 60b, 60c that mate at the end heating point HEP as shown while the temperature monitor or thermocouple wires S1, S2 are housed within and extend throughout a third separate elongated mounting tube 60a and terminate distally in the temperature sensor point T that is axially separated from HEP by distance D. As shown, complementary grooves 60aa, 60bb and 60cc are machined into the outside surface of heater tube 20 for ease of mounting corresponding mounting tubes 60a, 60b, 60c within such grooves in contact with the body of the walls of heater tube 20. As shown the distal downstream end of the mounting tube 60a containing the thermocouple wires S1, S2 penetrates through a machined aperture 23 in the wall of the heater tube 20 enabling the terminal sensor point T to be positioned/ mounted within a groove 53 of a thermal insulator 50b. The thermal insulator 50b has an internal mounting groove 53 for receiving the distal tip end of mounting tube 60a and is mounted within the interior of the heater tube 20 at its distal tip end as shown. As shown, the distal end of the elongated tube 60a that houses the thermocouple wires S1, S2 and the temperature sensing point T, is routed through the aperture 23 in the distal end of the wall of the heater tube 20 from the outer surface of the tube to the interior of the tube 20 at its distal tip interior end. At the distal tip interior end of the tube 20, the insulator 50b is mounted or attached in an arrangement such that the distal end of the mounting tube 60a can be and is routed into a receiving and mounting groove 53 provided on the inner circumference of the insulator 50a. Once the distal end of the tube 60a is mounted within the groove 53 of the insulator, the temperature sensing point T is thermally isolated from the upstream heater device H1, H2 and associated heater mounting tubes 60b, 60c that are also spatially separated along the axis A from the end point of the heater HEP by a distance of at least about 0.125 inches as described above with regard to other embodiments. The insulator 50a can be fixed or mounted at the distal tip end of the tube 20 by any conventional means such as snap-fitting, bolting, welding, screwing or the like.

With reference to FIGS. 14-18, in a manner similar to the embodiments described above where the insulator 50 is embedded within a cast material and separates the body of cast material into a larger heated body portion 40a and a selected thermally isolated portion 40c, the insulator 50b is mounted on or to the heated body 20 in an arrangement that substantially thermally and spatially separates the larger upstream heated body portion 20a of the heater tube 20 from the interior wall surface or area 30c of the tube 20, the interior surface or area 30c comprising a selected body portion with which the sensor T is in immediate adjacency and/or contact with for purposes of measurement of the temperature of the nozzle and/or tube at that position or location 30c. Such separation of physical engagement results in thermal isolation and separation of the sensor T from the larger upstream heated body portion 20a of the heater tube as well as the larger upstream heated portion of the nozzle 30.

FIGS. 19-22 show another alternative embodiment of the invention in which a mounting and receiving insert 120 is mountable within a receiving and mounting aperture 20x that is machined into the wall of the heater tube at its distal tip end as shown. The outside surface contour of the insert 120 is complementary to the contour of the aperture 20x such that the insert 120 is readily receivable within the aperture 20x. The edges of the insert 120 are provided with flanges 122 for better enabling mounting of the insert 120 within aperture 20x. Once the insert 120 is positioned within the distal end-positioned aperture 20x, the distal tip end of mounting tube 60 which houses temperature sensor point T can be inserted within an interior receiving and mounting groove 124 provided within insert 120 such that the distal tip end of mounting tube 60 is securely mounted within the mounting groove 124 for positioning in close proximity and/or contact with the outer circumferential surface of the nozzle 30 when the heater tube 20 is positioned around the nozzle. The insert can be comprised of a thermal insulating material as described above such that the temperature sensing point T is thermally isolated from the upstream end point of the heater HEP in addition to being spatially distanced. In the FIGS. 19-22 embodiment, the heater elements H1, H2 are housed/contained within the same tube 60 as the temperature sensing wires S1, S2. And, the heater end point HEP is axially distanced upstream from the sensor point by at least about 0.125 inches as described above with regard to other embodiments. In a manner similar to the embodiments described above where the insulator 50 is embedded within a cast material and separates the body of cast material into a larger heated body portion 40a and a selected thermally isolated portion 40c, the insulator 120 is mounted within the aperture 20x within the heated body 20 in an arrangement that substantially thermally and spatially separates the larger upstream heated body portion 20a of the heater tube 20 from the interior wall surface or area 30c of the tube 20, the interior surface or area 30c comprising a selected body portion with which the sensor T is in immediate adjacency and/or contact with for purposes of measurement of the temperature of the nozzle and/or tube at that position or location 30c. Such separation of physical engagement results in thermal isolation and separation of the sensor T from the larger upstream heated body portion 20a of the heater tube as well as the larger upstream heated portion of the nozzle 30.

Figure 23:
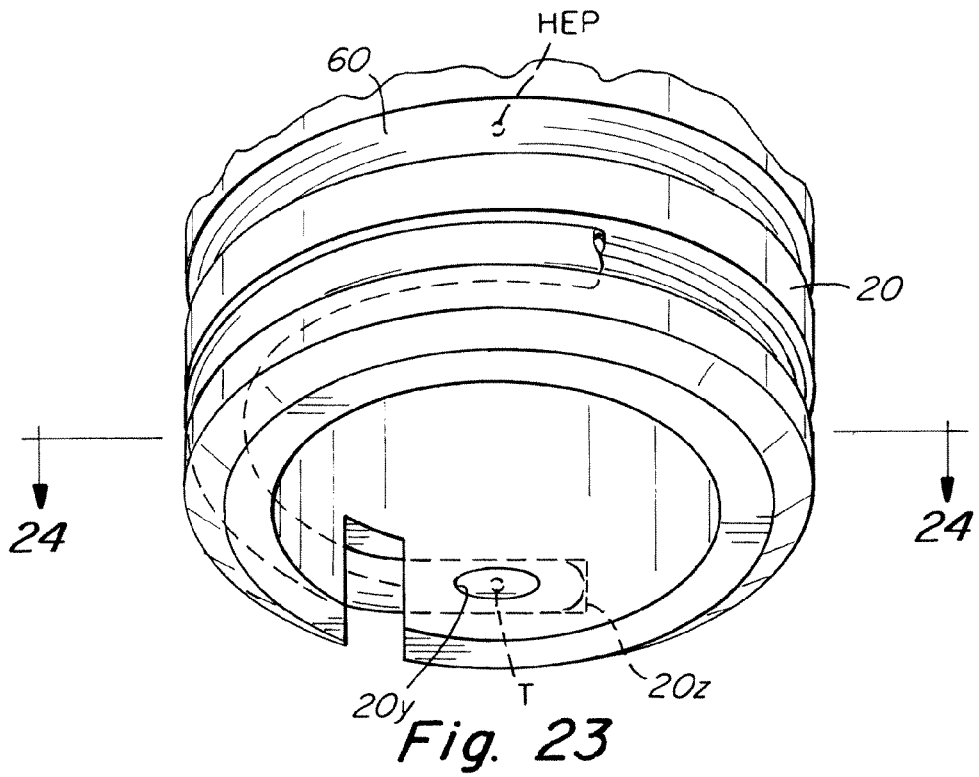
FIG. 23 is a bottom end perspective view of the distal end of another embodiment of an apparatus according to the invention showing the distal tip end of an elongated mounting tube routed through a bore drilled through the body of the heater tube at its distal end to position the temperature sensor component in a position that is immediately adjacent and exposed to the interior of the bore of the heater tube and thus in immediate adjacency to the outer surface of the nozzle.
Figure 24:
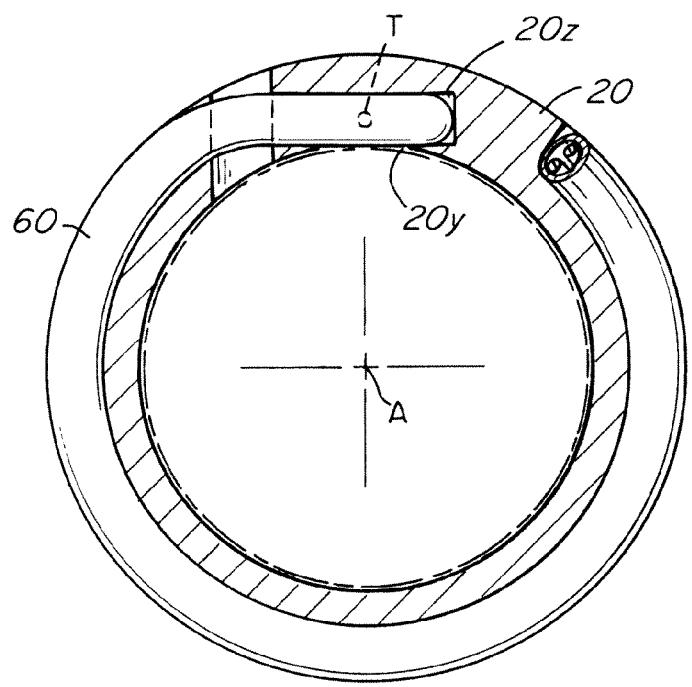
FIG. 24 is a top radial cross-sectional view taken along lines 24-24 of FIG. 23.

FIGS. 23-24 show another alternative embodiment of the invention where a slot 20z for receiving the distal end of the mounting tube 60 is machined into the distal tip end of the wall of the heater tube 20. As shown, the distal tip end of the mounting tube 60 that contains the sensor point T is routed into and received by the slot 20z aligning and positioning the distal tip end of the tube 60 and its associated sensor point T at a small interior aperture 20y on the interior surface of the distal tip end of the heater tube 20. As shown in FIG. 24, sensor point is thus mounted and positioned within the wall of the tube such that the sensor point is positioned immediately adjacent the outer surface of the wall of the nozzle 30 around which the heater tube 20 is mounted. In the FIGS. 23-24 embodiment, the heater elements H1, H2 are housed/contained within the same tube 60 as the temperature sensing wires S1, S2. And, the heater end point HEP is axially distanced upstream from the sensor point by at least about 0.125 inches as described above with regard to other embodiments.

Having described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention includes reasonable equivalents of the invention described and claimed in this application.

What is claimed is:

1. Apparatus for measuring the temperature of a nozzle having fluid material injected from an injection molding machine through a flow channel in a heated manifold that is coupled to a nozzle that is coupled to the cavity of a mold, the apparatus comprising:
a heating device comprising a controllably heatable thermally conductive heating element;
the nozzle comprising a tube of thermally conductive material having an outer surface and an inner surface defining a central flow bore having an axis extending from an upstream end to a downstream end of the flow bore, the flow bore being coupled to the flow channel of the manifold and the cavity of the mold;
the heating element of the heating device being mounted on or around the outer surface of the tube of the nozzle such that heat is transferable between the heating element and the outer surface of the thermally conductive nozzle, the heating element extending along the axis of the flow bore of the nozzle to an end point of the heating element;
a temperature monitor comprising a temperature sensor mounted on or around the nozzle at a selected position along the axis of the bore of the nozzle;
a thermal insulator disposed along the axis of the nozzle separating the end point of the heating element and the temperature sensor; the heating element and the temperature sensor are both disposed within an elongated tube comprising a thin-walled sheath, an interior bore and having a length,
the thin-walled sheath being comprised of a thermally conductive material,
the elongated tube being mounted on or around the nozzle,
the heating element and wires connected to the temperature sensor extending through the interior bore and separately terminating at first and second distal positions along the length of the elongated tube such that the end point of the heating element and the temperature sensor are separated axially along the axis of the bore of the nozzle by a distance of at least about 0.125 inches.

2. The apparatus of claim 1 wherein the elongated tube is wound around the nozzle extending along the axis of the bore of the nozzle.

3. The apparatus of claim 1 wherein the elongated tube is mounted within a sheath of a thermally conductive material that is attachably cast onto and around the outside surface of the nozzle.

4. The apparatus of claim 3 wherein a thermal insulator is disposed between the end point of the heating element and the temperature sensor such that heat transfer between the end point of the heating element and the temperature sensor is substantially reduced.

5. The apparatus of claim 4 wherein the thermal insulator is comprised of a material having a thermal conductivity of about 10 watts/meter-Kelvin or less.

6. The apparatus of claim 5 wherein the thermally conductive material of the sheath has a thermal conductivity of greater than about 150 watts/meter-Kelvin.

7. The apparatus of claim 5 wherein the thermally conductive material of the sheath has a thermal conductivity of greater than about 150 watts/meter-Kelvin.

8. The apparatus of claim 4 wherein the thermal insulator is comprised of a material having a thermal conductivity of about 10 watts/meter-Kelvin or less.

9. The apparatus of claim 1 wherein the elongated tube is mounted around an outside surface of a heating tube, the heating tube being comprised of a tubular wall of thermally conductive material that forms an interior mounting bore having a configuration that readily receives the outer surface of the nozzle and is readily removable from the outer surface of the nozzle.

10. The apparatus of claim 9 wherein the elongated tube is mounted within a sheath of a thermally conductive material that is attachably cast onto and around the outside surface of the tubular wall of the heating tube.

11. The apparatus of claim 10 wherein a thermal insulator is disposed between the end point of the heating element and the temperature sensor such that heat transfer between the end point of the heating element and the temperature sensor is substantially reduced.

12. Apparatus for measuring the temperature of a nozzle having fluid material injected from an injection molding machine through a flow channel in a heated manifold that is coupled to a nozzle that is coupled to the cavity of a mold, the apparatus comprising:
   a heating device comprising a controllably heatable thermally conductive heating element;
   the nozzle comprising a tube of thermally conductive material having an outer surface and an inner surface defining a central flow bore having an axis extending from an upstream end to a downstream end of the flow bore, the flow bore being coupled to the flow channel of the manifold and the cavity of the mold;
   the heating element of the heating device being mounted on or around the outer surface of the tube of the nozzle such that heat is transferable between the heating element and the outer surface of the thermally conductive nozzle, the heating element extending along the axis of the flow bore of the nozzle to an end point of the heating element;
   a temperature monitor comprising a temperature sensor mounted on or around the nozzle at a selected position along the axis of the bore of the nozzle;
   a thermal insulator disposed along the axis of the nozzle separating the end point of the heating element and the temperature sensor;
   the heating device and the temperature monitor are mounted around an outside surface of a heating tube;
   the heating tube being comprised of a tubular wall of thermally conductive material that forms an interior mounting bore having a configuration that readily receives the outer surface of the nozzle and is readily removable from the outer surface of the nozzle, and,
   the heating device and the temperature sensor are mounted within a sheath of a thermally conductive material that is attachably cast onto and around an outside surface of the tubular wall of the heating tube.

13. The apparatus of claim 12 wherein the thermal insulator is disposed between the end point of the heating element and the temperature sensor such that heat transfer between the end point of the heating element and the temperature sensor is substantially reduced.

14. The apparatus of claim 13 wherein the thermal insulator is comprised of a material having a thermal conductivity of about 10 watts/meter-Kelvin or less.

15. The apparatus of claim 14 wherein the thermally conductive material of the sheath has a thermal conductivity of greater than about 150 watts/meter-Kelvin.

16. Apparatus of claim 12 wherein the temperature monitor comprises wires connected to the temperature sensor, the wires penetrating through the tubular wall of the heating tube such that the temperature sensor is disposed within the interior mounting bore of the heating tube.

17. Apparatus of claim 16 wherein the thermal insulator is disposed between the end point of the heating element and the temperature sensor such that heat transfer between the end point of the heating element and the temperature sensor is substantially reduced.

18. Apparatus of claim 17 wherein:
   the heating element and the wires connected to the temperature sensor are disposed within an elongated tube having a thin-walled sheath, an interior bore and a length,
   the thin-walled sheath being comprised of a thermally conductive material,
   the elongated tube being mounted on or around the nozzle,
   the heating element and the wires of the temperature sensor extending through the interior bore and separately terminating at first and second distal positions along the length of the elongated tube such that the end point of the heating element and the temperature sensor are separated axially along the axis of the bore of the nozzle by a distance of at least about 0.125 inches.

19. Apparatus of claim 16 wherein:
   the heating element and the wires connected to the temperature sensor are disposed within an elongated tube having a thin-walled sheath, an interior bore and a length,
   the thin-walled sheath being comprised of a thermally conductive material,
   the elongated tube being mounted on or around the nozzle,
   the heating element and the wires connected to the temperature sensor extending through the interior bore and separately terminating at first and second distal positions along the length of the elongated tube such that the end point of the heating element and the temperature sensor are separated axially along the axis of the bore of the nozzle by a distance of at least about 0.125 inches.

20. Apparatus for measuring the temperature of a nozzle having fluid material injected from an injection molding machine through a flow channel in a heated manifold that is coupled to a nozzle that is coupled to the cavity of a mold, the apparatus comprising:
   a heating device comprising a controllably heatable thermally conductive heating element;
   the nozzle comprising a tube of thermally conductive material having an outer surface and an inner surface defining a central flow bore having an axis extending from an upstream end to a downstream end of the flow bore, the flow bore being coupled to the flow channel of the manifold and the cavity of the mold;
   the heating element of the heating device being mounted on or around the outer surface of the tube of the nozzle such that heat is transferable between the heating element and the outer surface of the thermally conductive nozzle, the heating element extending along the axis of the flow bore of the nozzle to an end point of the heating element;
   a temperature monitor comprising a temperature sensor mounted on or around the nozzle at a selected position along the axis of the bore of the nozzle;
   a thermal insulator disposed along the axis of the nozzle separating the end point of the heating element and the temperature sensor;
   the heating device and the temperature sensor are mounted within a sheath of a thermally conductive material that is attachably cast onto and around the outside surface of the nozzle.

21. The apparatus of claim 20 wherein a thermal insulator is disposed between the end point of the heating element and the temperature sensor such that heat transfer between the end point of the heating element and the temperature sensor is substantially reduced.

22. The apparatus of claim 21 wherein the thermal insulator is comprised of a material having a thermal conductivity of about 10 watts/meter-Kelvin or less.

23. The apparatus of claim 22 wherein the thermally conductive material of the sheath has a thermal conductivity of greater than about 150 watts/meter-Kelvin.

24. Apparatus for measuring the temperature of a nozzle having fluid material injected from an injection molding machine through a flow channel in a heated manifold that is coupled to a nozzle that is coupled to the cavity of a mold, the apparatus comprising:
- a heating device comprising a controllably heatable thermally conductive heating element;
- the nozzle comprising a tube of thermally conductive material having an outer surface and an inner surface defining a central flow bore having an axis extending from an upstream end to a downstream end of the flow bore, the flow bore being coupled to the flow channel of the manifold and the cavity of the mold;
- the heating element of the heating device being mounted on or around the outer surface of the tube of the nozzle such that heat is transferable between the heating element and the outer surface of the thermally conductive nozzle, the heating element extending along the axis of the flow bore of the nozzle to an end point of the heating element;
- a temperature monitor comprising a temperature sensor mounted on or around the nozzle at a selected position along the axis of the bore of the nozzle;
- a thermal insulator disposed along the axis of the nozzle separating the end point of the heating element and the temperature sensor;
- the heating element is disposed within a first elongated tube comprising a thin-walled sheath, an interior bore and having a length,
- the temperature sensor is disposed within a second elongated tube comprising a thin-walled sheath, an interior bore and having a length,
- the thin-walled sheaths of the first and second elongated tubes being comprised of a thermally conductive material,
- the first and second elongated tubes being mounted on or around the nozzle, the heating element and the temperature monitor extending through the interior bores respectively of the first and seconds elongated tubes and separately terminating at first and second distal positions along the length of the first and second elongated tubes such that the end point of the heating element and the temperature sensor are separated axially along the axis of the bore of the nozzle by a distance of at least about 0.125 inches.

25. The apparatus of claim 24 wherein a thermal insulator is disposed between the end point of the heating element and the temperature sensor such that heat transfer between the end point of the heating element and the temperature sensor is substantially reduced.

26. The apparatus of claim 25 wherein the thermal insulator is comprised of a material having a thermal conductivity of about 10 watts/meter-Kelvin or less.

27. The apparatus of claim 26 wherein the thermally conductive material of the sheath has a thermal conductivity of greater than about 150 watts/meter-Kelvin.

28. The apparatus of claim 25 wherein the first and second elongated tubes are mounted within a sheath of a thermally conductive material that is attachably cast onto and around the outside surface of the nozzle.

29. The apparatus of claim 28 wherein the first and second elongated tubes are mounted within a sheath of a thermally conductive material that is attachably cast onto and around the outside surface of the tubular wall of the heating tube.

30. The apparatus of claim 25 wherein the first and second elongated tubes are mounted around an outside surface of a heating tube:
- the heating tube being comprised of a tubular wall of thermally conductive material that forms an interior mounting bore having a configuration that readily receives the outer surface of the nozzle and is readily removable from the outer surface of the nozzle.

31. Apparatus for measuring the temperature of a nozzle having fluid material injected from an injection molding machine through a flow channel in a heated manifold that is coupled to a nozzle that is coupled to the cavity of a mold, the apparatus comprising:
- a heating device comprising a controllably heatable thermally conductive heating element;
- the nozzle comprising a tube of thermally conductive material having an outer surface and an inner surface defining a central flow bore having an axis extending from an upstream end to a downstream end of the flow bore, the flow bore being coupled to the flow channel of the manifold and the cavity of the mold;
- the heating element of the heating device being mounted on or around the outer surface of the tube of the nozzle such that heat is transferable between the heating element and the outer surface of the thermally conductive nozzle, the heating element extending along the axis of the flow bore of the nozzle to an end point of the heating element;
- a temperature monitor having a length and terminating at a distal end in a temperature sensor, the temperature monitor being mounted on or around the nozzle such that the temperature sensor is mounted at a position that is thermally isolated from the end point of the heating element;
- a thermal insulator disposed between the end point of the heating element and the temperature sensor, the thermal insulator being comprised of a material having a thermal conductivity of about 10 watts/meter-Kelvin or less;
- the temperature sensor being mounted on or around the nozzle such that the temperature sensor is spatially separated from the end point of the heating element by at least about 0.125 inches;
- the heating element and the temperature sensor are disposed within an elongated tube comprising a thin-walled sheath, an interior bore and having a length,
- the thin-walled sheath being comprised of a thermally conductive material,
- the elongated tube being mounted on or around the nozzle,
- the heating element and the temperature monitor extending through the interior bore and separately terminating at first and second distal positions along the length of the elongated tube such that the end point of the heating element and the temperature sensor are separated axially along the axis of the bore of the nozzle by a distance of at least about 0.125 inches.

* * * * *

UNITED STATES PATENT AND TRADEMARK OFFICE
CERTIFICATE OF CORRECTION

PATENT NO. : 8,297,836 B2  
APPLICATION NO. : 12/614604  
DATED : October 30, 2012  
INVENTOR(S) : Kuntz et al.

Page 1 of 1

It is certified that error appears in the above-identified patent and that said Letters Patent is hereby corrected as shown below:

IN THE CLAIMS:  
Please amend the following:

Col. 14, line 13, claim 19:

change "sensore" to -- sensor --

Col. 16, line 7, claim 30:

change ":" to -- ; --

Signed and Sealed this  
Fifth Day of March, 2013

Teresa Stanek Rea  
*Acting Director of the United States Patent and Trademark Office*